(12) United States Patent
Zhu

(10) Patent No.: US 11,637,594 B2
(45) Date of Patent: Apr. 25, 2023

(54) DATA TRANSMISSION METHOD AND APPARATUS VIA A PLURALITY OF BEAMS

(71) Applicant: BEIJING XIAOMI MOBILE SOFTWARE CO., LTD., Beijing (CN)

(72) Inventor: Yajun Zhu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 86 days.

(21) Appl. No.: 16/651,968

(22) PCT Filed: Sep. 30, 2017

(86) PCT No.: PCT/CN2017/105084
§ 371 (c)(1),
(2) Date: Mar. 27, 2020

(87) PCT Pub. No.: WO2018/141165
PCT Pub. Date: Aug. 9, 2018

(65) Prior Publication Data
US 2020/0259531 A1 Aug. 13, 2020

(51) Int. Cl.
*H04B 7/0408* (2017.01)
*H04B 7/06* (2006.01)
(Continued)

(52) U.S. Cl.
CPC ......... *H04B 7/0408* (2013.01); *H04B 7/0617* (2013.01); *H04W 72/042* (2013.01); *H04W 72/046* (2013.01); *H04W 72/0466* (2013.01)

(58) Field of Classification Search
CPC ....... H04W 8/18; H04W 8/245; H04W 16/28;
H04W 72/04; H04W 72/042; H04W 72/046; H04W 72/048; H04W 72/08; H04W 72/10; H04W 72/085; H04W 72/1263; H04B 7/0408
(Continued)

(56) References Cited

U.S. PATENT DOCUMENTS 9,750,003 B2 * 8/2017 Yu .................. H04W 72/042
9,942,886 B1 * 4/2018 John Wilson ......... H04L 5/0035
(Continued)

FOREIGN PATENT DOCUMENTS

CN  103688474 A  3/2014
CN  106850162 A  6/2017
(Continued)

OTHER PUBLICATIONS

Downlink control channel design considerations. OPPO, Nov. 2016, 3GPP, R1-1611704.*
(Continued)

*Primary Examiner* — Jason E Mattis
(74) *Attorney, Agent, or Firm* — Arch & Lake LLP

(57) ABSTRACT

A data transmission method, comprises: receiving a plurality of pieces of control information issued by a base station via a plurality of beams, each piece of control information comprising resource information, the resource information indicating one or more transmission units configured by the base station for a terminal; using the plurality of beams to perform data transmission on the plurality of transmission units indicated by the plurality of pieces of control information.

8 Claims, 19 Drawing Sheets

Receiving a plurality of pieces of control information transmitted by a base station via a plurality of beams, each piece of control information including resource information, the resource information indicating one or a plurality of transmission units configured by the base station for the terminal — 101

Obtaining the plurality of target beams corresponding to the plurality of transmission units indicated by a first piece of control information according to a pre-stored corresponding relation between the transmission unit and the beam, each target beam corresponding to at least one transmission unit — 102, 1021

Performing data transmission, via the first target beam, on at least one transmission unit corresponding to the first target beam among the plurality of transmission units indicated by the first piece of control information — 1022

(51) Int. Cl.
*H04W 72/04* (2023.01)
*H04W 72/044* (2023.01)

(58) Field of Classification Search
USPC .......................................... 370/310, 328, 329
See application file for complete search history.

(56) References Cited

U.S. PATENT DOCUMENTS

| | | | | |
|---|---|---|---|---|
| 10,009,083 | B2* | 6/2018 | Yang | ...................... H04B 17/318 |
| 10,165,456 | B2* | 12/2018 | Reial | ...................... H04L 5/0094 |
| 10,425,139 | B2* | 9/2019 | Guo | ...................... H04L 5/0007 |
| 10,560,173 | B2* | 2/2020 | Seo | ...................... H04J 11/0023 |
| 10,735,157 | B2* | 8/2020 | Liu | ...................... H04W 72/046 |
| 10,826,661 | B2* | 11/2020 | Miao | ...................... H04L 5/0048 |
| 11,019,601 | B2* | 5/2021 | Lee | ...................... H04W 72/00 |
| 11,044,714 | B2* | 6/2021 | Tang | ...................... H04W 72/085 |
| 11,064,475 | B2* | 7/2021 | Zhang | ...................... H04B 7/0452 |
| 2014/0064205 | A1* | 3/2014 | Feng | ...................... H04L 5/001 |
| | | | | 370/329 |
| 2016/0095984 | A1 | 4/2016 | Franklin et al. | |
| 2016/0211899 | A1 | 7/2016 | Yang et al. | |
| 2018/0219606 | A1* | 8/2018 | Ng | ...................... H04L 5/0048 |
| 2019/0149217 | A1* | 5/2019 | Yang | ...................... H04B 7/0695 |
| | | | | 370/329 |
| 2019/0222288 | A1* | 7/2019 | Zhou | ...................... H04L 27/2613 |
| 2019/0253116 | A1* | 8/2019 | Priyanto | ...................... H04B 7/0695 |
| 2020/0036566 | A1* | 1/2020 | Moroga | ...................... H04L 5/0094 |

FOREIGN PATENT DOCUMENTS

| | | |
|---|---|---|
| CN | 106888042 A | 6/2017 |
| CN | 107005377 A | 8/2017 |
| WO | 2013100719 A1 | 7/2013 |

OTHER PUBLICATIONS

Discussion on the NR-PDCCH design. NTT DOCOMO. Jan. 2017, 3GPP, R1-1700619.*
International Search Report to PCT Application No. PCT/CN2017/105084 dated May 4, 2018 with English translation, (4p).
First CNOA issued in Application No. 201780003596.2 dated Sep. 2, 2022, with English translation,(13p).

* cited by examiner

DATA TRANSMISSION METHOD AND APPARATUS VIA A PLURALITY OF BEAMS

CROSS-REFERENCE TO RELATED APPLICATION

This application is a National Stage of International Application No. PCT/CN2017/105084, filed Sep. 30, 2017, the contents of all of which are incorporated herein by reference in their entirety

TECHNICAL FIELD

The present disclosure relates to the field of communication technologies, and in particular to a data transmission method and a data transmission apparatus.

BACKGROUND

In a new generation of wireless cellular communication system, a base station may operate at a higher frequency band. In order to avoid the problem of high path loss caused by an increase in the carrier frequency, the communication system provide services to a terminal with the multi-beam technology.

In the related art, the base station may adjust transmission parameter information of a plurality of antennas in the antenna array, and use the plurality of antennas to directionally transmit high-frequency beams toward a direction where the terminal is located. After accessing the high-frequency beams, the terminal may use communication resource of the high-frequency beams to establish a communication connection with the base station, to receive information via the high-frequency beams.

SUMMARY

Embodiments of the present disclosure provide a data transmission method and a data transmission apparatus. The technical solutions are as follows.

According to a first aspect of the embodiments of the present disclosure, a data transmission method is provided. The method is applied to a terminal and includes:
  receiving a plurality of pieces of control information transmitted by a base station via a plurality of beams, each piece of control information comprising resource information, the resource information indicating one or a plurality of transmission units configured by the base station for the terminal; and
  performing data transmission, via the plurality of beams, on the plurality of transmission units indicated by the plurality of pieces of control information according to the plurality of pieces of control information.

According to a second aspect of the embodiments of the present disclosure, a data transmission method is provided. The method is applied to a base station and includes:
  obtaining a plurality of transmission units configured by the base station for a terminal;
  generating a plurality of pieces of control information according to the plurality of transmission units, each piece of control information including resource information, the resource information indicating one or a plurality of transmission units configured by the base station for the terminal; and
  transmitting, via a plurality of beams supported by the base station, the plurality of pieces of control information to the terminal.

According to a third aspect of the embodiments of the present disclosure, a data transmission apparatus is provided. The apparatus includes:
  a first processor; and
  a first memory configured to store instructions executable by the first processor;
  wherein the first processor is configured to:
  receive a plurality of pieces of control information transmitted by a base station via a plurality of beams, each piece of control information including resource information, the resource information indicating one or a plurality of transmission units configured by the base station for a terminal; and
  perform data transmission, via the plurality of beams, on the plurality of transmission units indicated by the plurality of pieces of control information according to the plurality of pieces of control information.

According to a fourth aspect of the embodiments of the present disclosure, a data transmission apparatus is provided. The apparatus includes:
  a second processor; and
  a second memory configured to store instructions executable by the second processor;
  wherein the second processor is configured to:
  obtain a plurality of transmission units configured by a base station for a terminal;
  generate a plurality of pieces of control information according to the plurality of transmission units, each piece of control information including resource information, the resource information indicating one or a plurality of transmission units configured by the base station for the terminal; and
  transmit, via a plurality of beams supported by the base station, the plurality of pieces of control information to the terminal.

According to a fifth aspect of the embodiments of the present disclosure, a non-volatile computer-readable storage medium is provided. The computer-readable storage medium stores thereon a computer instruction, wherein when the instruction is executed by a processor, the steps in the method according to any embodiment in the first aspect is performed.

According to an sixth aspect of the embodiments of the present disclosure, a non-volatile computer-readable storage medium is provided. The computer-readable storage medium stores thereon a computer instruction, wherein when the instruction is executed by a processor, the steps in the method according to any embodiment in the second aspect is performed.

It is to be understood that both the foregoing general description and the following detailed description are exemplary and explanatory only and are not intended to limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Exemplary embodiments will be described in detail herein, examples of which are illustrated in the accompanying drawings. The following description refers to the accompanying drawings in which the same numbers in different drawings represent the same or similar elements unless otherwise indicated. The implementations set forth in the following exemplary embodiments do not represent all implementations consistent with the present invention. Rather, they are merely examples of apparatuses and methods consistent with certain aspects of the present disclosure as detailed in the appended claims.

The technical solution provided in the embodiments of the present disclosure relates to a terminal and a base station that are connected with each other via a mobile communication network. The terminal herein may be a mobile phone, a tablet computer, a smart watch, and other devices with mobile communication functions, which are not limited in the embodiments of the present disclosure. In the related art, a base station may support multiple beams to perform data transmission. After the terminal accesses the base station, the base station may configure a beam that can be used for data transmission among the multiple beams for the terminal, so that the terminal may access the beam according to the configuration of the base station and perform data interaction. In a cell covered by the base station, there may be a great number of terminals. When the base station configures beams for different terminals, the problem that a plurality of terminals may access the same beam can arise. If too many terminals access the beam, or all the terminals accessing the beam need to transmit a large number of data packets in a short period of time, the packet loss is very likely to occur during data transmission, which thereby causes the data transmission to be unreliable. In the technical solutions provided in the embodiments of the present disclosure, a base station can transmit a plurality of pieces of control information to a terminal via multiple supported beams according to the requirements of the terminal, so that the terminal can obtain a plurality of target beams corresponding to a plurality of transmission units indicated by each piece of control information after receiving the plurality of pieces of control information, and perform data transmission according to the plurality of target beams, thereby implementing a multi-beam data transmission solution. Thus, the probability of packet loss during data transmission is reduced, and the reliability and effectiveness of data transmission is increased.

Embodiments of the present disclosure provide a data transmission method, and execution bodies for implementing the method include a terminal and a base station. Based on different bodies for implementing the method, two sets of embodiments as follows are provided in the present disclosure.

Terminal Side

Figure 1A:
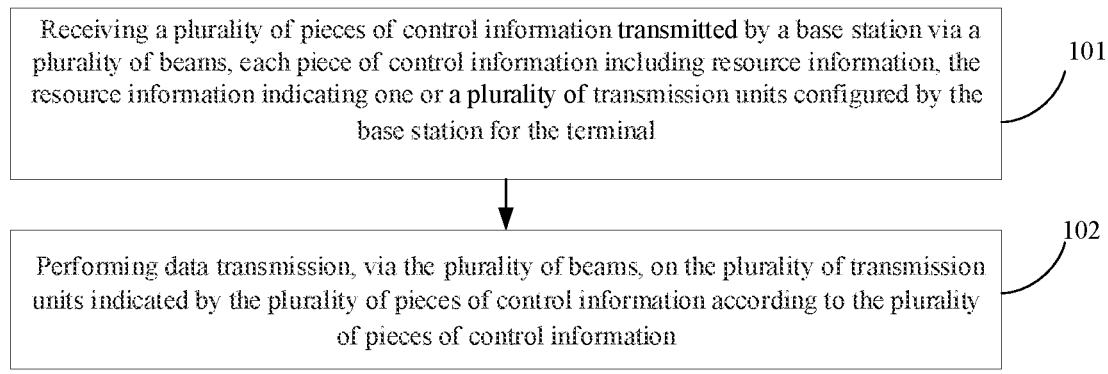
FIG. 1a is a flow chart of a data transmission method according to exemplar, embodiment.

FIG. 1*a* is a flow chart of a data transmission method according to an exemplary embodiment, and the data transmission method is applied to a terminal. As illustrated in FIG. 1*a*, the method includes following steps 101 and 102.

In step 101, the terminal receives a plurality of pieces of control information transmitted by a base station via a plurality of beams, each piece of control information including resource information, the resource information indicating one or a plurality of transmission units configured by the base station for the terminal.

Exemplarily, the control information may be downlink control information (DCI), or other information transmitted by the base station to the terminal for resource scheduling, which is not limited in the embodiments of the present disclosure.

Generally, the base station may support multiple beams, and a plurality of terminals may access each beam. The base station configures a transmission unit for data transmission for each terminal according to the requirements of each terminal or according to the number of uplink and downlink data packets. The transmission unit may be a slot, or may also be a symbol, a sub-frame, a radio frame, or other types of time domain units in the time domain, and the transmission unit may be a continuous or discontinuous frequency domain resource block (PRB), a bandwidth part, or another type of frequency domain unit in the frequency domain, which is not limited in the embodiments of the present disclosure.

Exemplarily, after configuring the plurality of transmission units for data transmission for the terminal, the base station may generate a plurality of pieces of control information according to the plurality of transmission units. Each piece of control information includes resource information, and the resource information indicates one or a plurality of transmission units configured by the base station for the terminal. For example, the control information may include the unit identifier of one or a plurality of transmission units, the unit identifier being configured to identify one or a plurality of transmission units configured by the base station for the terminal for data transmission. That is, the unit identifier of the one or a plurality of transmission units constitutes the resource information scheduled by the control information.

After obtaining the plurality of pieces of control information, the base station may use multiple beams to transmit the plurality of pieces of control information, such that the terminal may receive the plurality of pieces of control information on the plurality of receivable beams.

In step 102, the terminal performs data transmission, via the plurality of beams, on the plurality of transmission units indicated by the plurality of pieces of control information according to the plurality of pieces of control information.

Exemplarily, after receiving the plurality of pieces of control information, the terminal may obtain a target beam corresponding to the one or the plurality of transmission units indicated by each of the plurality of pieces of control information, and then perform data transmission or data reception, via different target beams, on the transmission units corresponding to different target beams.

With the technical solution provided in the embodiments of the present disclosure, a terminal can obtain a plurality of target beams corresponding to a plurality of transmission units indicated by each piece of control information according to the plurality of pieces of control information transmitted by a base station, and thus perform data transmission according to the plurality of target beams, thereby implementing a multi-beam data transmission solution. Thus, the probability of packet loss during data transmission is reduced, and the reliability of data transmission is increased.

Figure 1B:
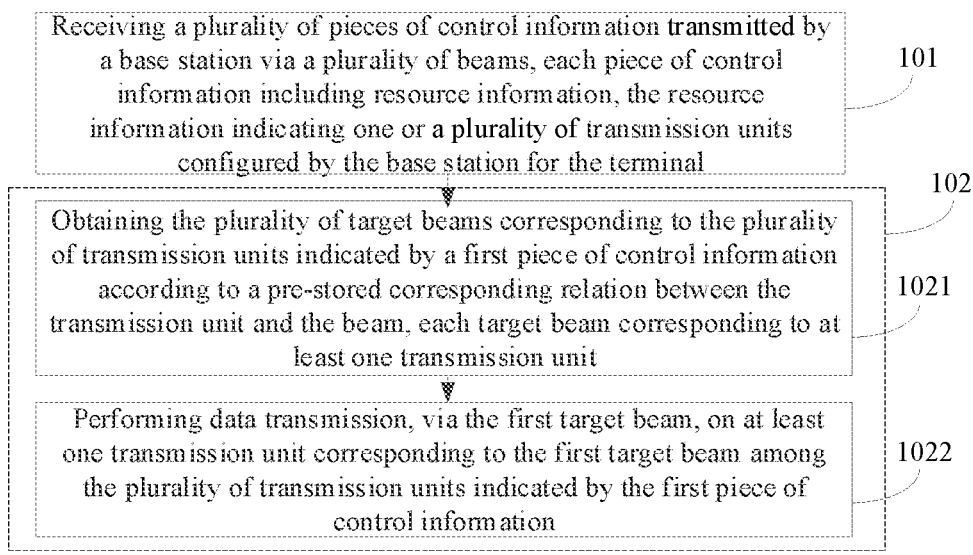
FIG. 1b is a flow chart of a data transmission method according to an exemplary embodiment.

In an embodiment, as illustrated in FIG. 1b, in step 102, performing data transmission, via the plurality of beams, on the plurality of transmission units indicated by the plurality of pieces of control information according to the plurality of pieces of control information may be implemented by steps 1021 and 1022.

In step 1021, the plurality of target beams corresponding to the plurality of transmission units indicated by a first piece of control information is obtained according to a pre-stored corresponding relation between the transmission unit and the beam, each target beam corresponding to at least one transmission unit.

In step 1022, data transmission is performed, via the first target beam, on at least one transmission unit corresponding to the first target beam among the plurality of transmission units indicated by the first piece of control information.

When or after the terminal accesses the system, the base station may transmit the pre-configured information to the terminal. The pre-configured information includes a corresponding relation between the transmission unit and the beam, which describes the corresponding relation between the plurality of transmission units and the plurality of beams. One beam may correspond to one or more transmission units.

Exemplarily, after receiving the plurality of pieces of control information, the terminal may sequentially obtain one or a plurality of transmission units indicated by each piece of control information, then query the corresponding relation between the transmission unit and the beam to determine a beam that corresponds to each transmission unit under the corresponding relation as a target beam, and perform data reception or data transmission on each transmission unit via the corresponding target beam.

Taking a first piece of control information and a first target beam as an example, the first piece of control information is any one of the plurality of pieces of control information, and the first target beam is any one of the plurality of target beams determined by the terminal according to the first piece of control information. Assuming that the resource configured for the terminal for data reception by the base station under the indication of the first piece of control information is the first transmission unit and the second transmission unit, that is, the first piece of control information is used for allocating downlink communication resources, then the terminal may determine that the first transmission unit corresponds to the first target beam and the second transmission unit corresponds to the second target beam according to the corresponding relation between the transmission unit and the beam. In this case, the terminal may receive, via the first target beam, data transmitted by the base station on the first transmission unit. Similarly, the terminal may also receive, via the second target beam, data transmitted by the base station on the second transmission unit.

Alternatively, assuming that the resource configured for the terminal for data transmission by the base station under the indication of the first piece of control information is the third transmission unit and the fourth transmission unit, that is, the first piece of control information is used for allocating uplink communication resources, then, the terminal may determine that the third transmission unit corresponds to the third target beam and the fourth transmission unit corresponds to the fourth target beam according to the corresponding relation between the transmission unit and the beam. In this case, the terminal may transmit, via the third target beam, data to the base station on the third transmission unit. Similarly, the terminal may also transmit, via the fourth target beam, data to the base station on the fourth transmission unit.

Figure 1C:
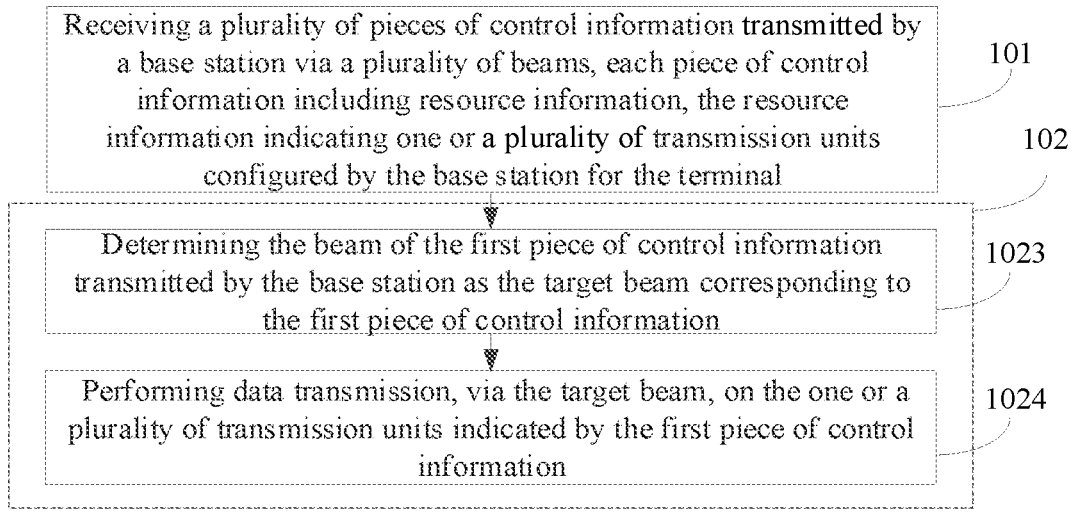
FIG. 1c is a flow chart of a data transmission method according to an exemplary embodiment.

In an embodiment, as illustrated in FIG. 1c, in step 102, performing data transmission, via the plurality of beams, on the plurality of transmission units indicated by the plurality of pieces of control information according to the plurality of pieces of control information may be implemented by steps 1023 and 1024.

In step 1023, the beam of the first piece of control information transmitted by the base station is determined as the target beam corresponding to the first piece of control information.

In step 1024, data transmission is performed, via the target beam, on the one or a plurality of transmission units indicated by the first piece of control information.

Exemplarily, upon receiving the plurality of pieces of control information on the plurality of beams, the terminal may record the issued beam of each piece of control information (i.e., the beam used when the base station issues the control information), and then use the issued beam of each piece of control information as the target beam to further perform data transmission on the target beam of each piece of control information via one or a plurality of transmission units indicated by each piece of control information.

Taking a first piece of control information as an example, the first piece of control information may be any one of the plurality of pieces of control information received by the terminal. When the terminal receives the first piece of control information, the terminal records the issued beam of the first piece of control information as the first target beam. Assuming that the transmission units configured for the terminal by the base station under the indication of the first piece of control information is the first transmission unit and the second transmission unit, if the first piece of control information is used for allocating uplink communication resource, then the terminal may perform data transmission; via the first target beam, on the first transmission unit and the second transmission unit; if the first piece of control information is used for allocating downlink communication resource, then the terminal may perform data reception, via the first target beam, on the first transmission unit and the second transmission unit.

Figure 1D:
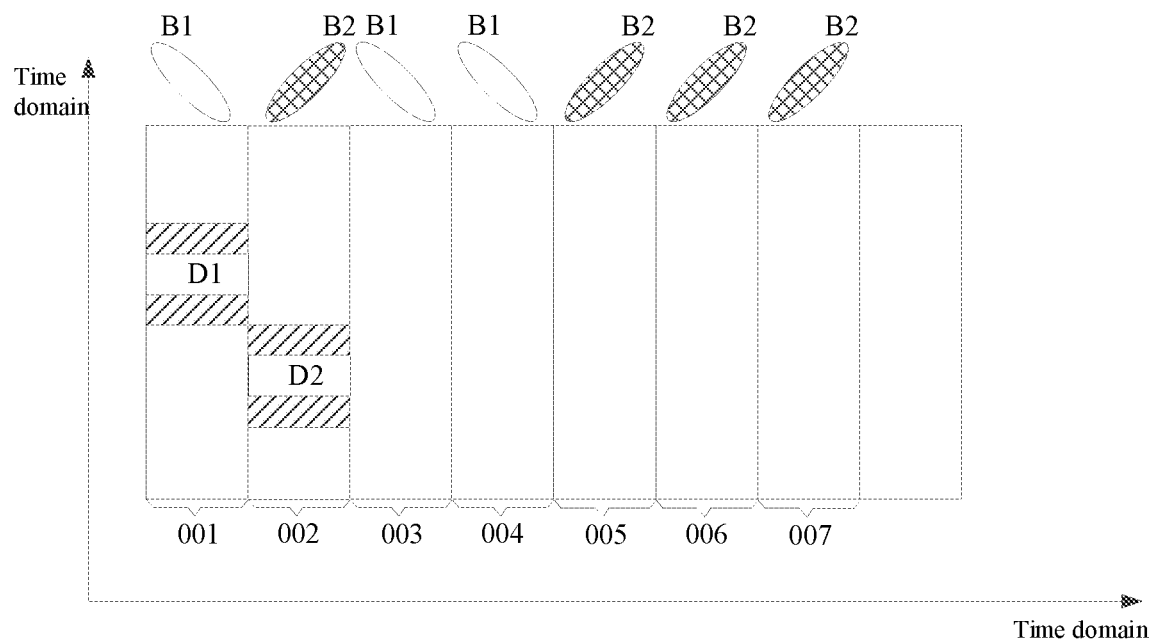
FIG. 1*d* is a schematic diagram of a transmission unit according to an exemplary embodiment.

Exemplarily, assuming that the terminal receives two pieces of control information, namely, a first DCI D1 and a second DCI D2, as illustrated in FIG. 1d, the base station may use a first symbol 001 of a slot to issue the first DCI D1 on a first beam B1, and use a second symbol 002 of a slot to issue the second DCI D2 on a second beam B2, then the terminal may record that the issued beam of the first DCI D1 is the first beam B1, and the issued beam of the second DCI D2 is the second beam B2. That is, the first beam B1 is the target beam corresponding to the first DCI D1, and the second beam B2 is the target beam corresponding to the second DCI D2. If the first DCI D1 indicates to schedule a third symbol 003 and a fourth symbol 004, and the second DCI D2 indicates to schedule a fifth symbol 005, a sixth symbol 006 and a seventh symbol 007, the terminal may perform data reception or transmission, via the first beam B1, on the third symbol 003 and the fourth symbol 004 of the slot, and perform data reception or transmission, via the second beam B2, on the fifth symbol 005, the sixth symbol 006 and the seventh symbol 007 of the slot.

Figure 1E:
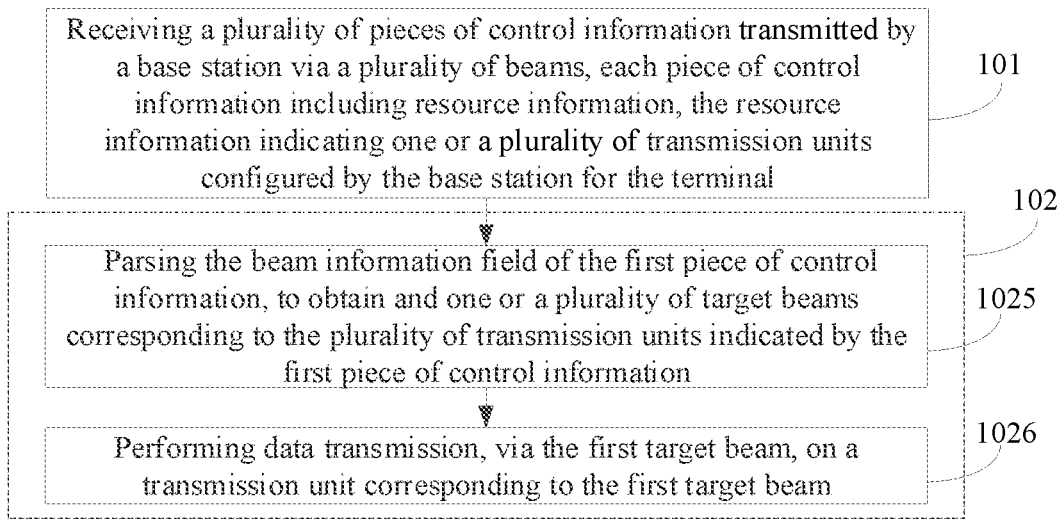
FIG. 1*e* is a flow chart of a data transmission method according to an exemplary embodiment.

In an embodiment, each piece of control information includes a beam information field, and information carried by the beam information field describes the target beam corresponding to each of the plurality of transmission units indicated by the corresponding resource information. As illustrated in FIG. 1e, in step 102, performing data transmission, via the plurality of beams, on the plurality of transmission units indicated by the plurality of pieces of control information according to the plurality of pieces of control information may be implemented by steps 1025 and 1026.

In step 1025, the beam information field of the first piece of control information is parsed, to obtain and one or a plurality of target beams corresponding to the plurality of transmission units indicated by the first piece of control information.

In step 1026, data transmission is performed, via the first target beam, on a transmission unit corresponding to the first target beam.

Exemplarily, when generating the plurality of pieces of control information according to the plurality of transmission units, the base station may write the target beam of the transmission unit indicated by each piece of control information into the beam information field of the control information according to a protocol of the control information. That is, the information carried by the beam information field describes the target beam corresponding to each of the plurality of transmission units indicated by the corresponding control information. The beam information field may be an original information field of the control information, or an information field newly set according to a protocol. If the beam information field is the newly set information field, the base station and the terminal may agree in advance on the length and position of the beam information field in the control information. The first target beam is any one of the plurality of target beams.

Taking the first piece of control information received by the terminal as an example, the first piece of control information may be any one of the plurality of pieces of control information received. After receiving the first piece of control information, the terminal firstly obtains the resources, i.e., a first transmission unit and a second transmission unit, scheduled by the first piece of control information, and then obtains the information with a preset length from a preset position, corresponding to the beam information field, of the first piece of control information, and parse the information, so that one or two target beams corresponding to the first transmission unit and the second transmission unit may be determined according to the information. Assuming that the first transmission unit corresponds to the first target beam and the second transmission unit corresponds to the second target beam, if the first piece of control information is used for allocating uplink communication resource, then the terminal may perform data transmission, via the first target beam, on the first transmission unit and perform data transmission, via the second target beam, on the second transmission unit; if the first piece of control information is used for allocating downlink communication resource, then the terminal may perform data reception, via the first target beam, on the first transmission unit and perform data reception, via the second target beam, on the second transmission unit.

Optionally, the terminal and the base station may agree in advance on the corresponding relation between the information field value and the beam, which describes the corresponding relation between different beams and different information field values in the beam information field. After receiving the control information, the terminal firstly obtains the beam information field of the control information, and then parses the beam information field of the control information according to the pre-stored corresponding relation between the information field value and the beam.

Assuming that the corresponding relation between the information field value and the beam describes that the information field value corresponding to the first beam is 000, the information field value corresponding to the second beam is 001, and the information field value corresponding to the third beam is 010, by taking an example in which the terminal parses the beam information field of the first piece of control information, then the terminal may obtain the information of the beam information field at the preset position corresponding to the beam information field of the first piece of control information after receiving the first piece of control information, and the information is "001010". According to the corresponding relation between the information field value and the beam, the terminal may obtain that the information field value in the beam information field represents the second beam and the third beam, respectively. Then, according to the mapping relation between the information field value and the transmission unit agreed with the base station, the terminal may obtain the target beam corresponding to each of the plurality of transmission units indicated by the first piece of control information respectively. For example, if the resources scheduled by the first piece of control information are the first transmission unit and the second transmission unit, and if the base station and the terminal agree that the information field values in the beam information field are in one-to-one correspondence with the transmission units in a writing sequence, the terminal may determine the second beam as the target beam of the first transmission unit, and determine the third beam as the target beam of the second transmission unit.

Optionally, the terminal may receive the corresponding relation between the beam and the information field value and the mapping relation between the information field value and the transmission unit transmitted by the base station via a radio resource control (RRC) signaling, a media access control-control element (MAC CE), or a physical layer signaling. During the data transmission process by the terminal, the base station may update the corresponding relation between the information field value and the beam or the mapping relation between the information field value and the transmission unit according to the specific situation and transmit the corresponding relation or the mapping relation to the terminal in time. In practical applications, the terminal may agree with the base station on the corresponding relation between the information field value and the beam and the mapping relation between the information field value and the transmission unit, and store the relations when initially accessing the network, or the terminal may preset the corresponding relation between the information field value and the beam and the mapping relation between the information field value and the transmission unit when leaving the factory, which is not limited in the embodiments of the present disclosure.

Figure 1F:
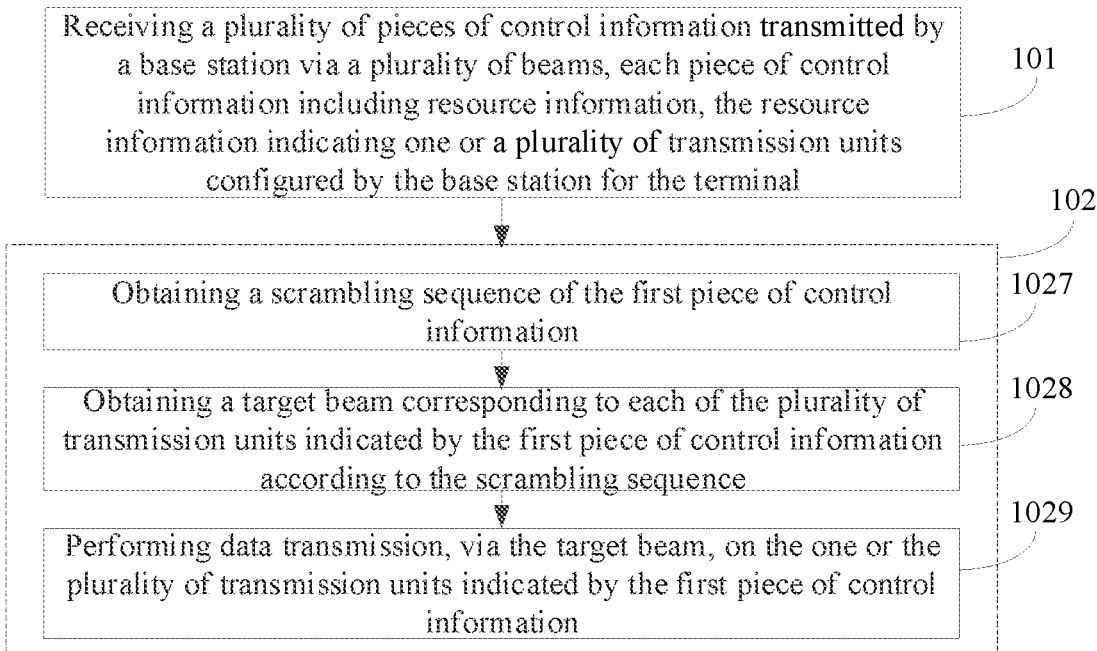
FIG. 1*f* is a flow chart of a data transmission method according to an exemplary embodiment.

In an embodiment, as illustrated in FIG. 1f in step 102, performing data transmission, via the plurality of beams, on the plurality of transmission units indicated by the plurality of pieces of control information according to the plurality of pieces of control information may be implemented by steps 1027 to 1029.

In step 1027, a scrambling sequence of the first piece of control information is obtained.

In step 1028, a target beam corresponding to each of the plurality of transmission units indicated by the first piece of control information is obtained according to the scrambling sequence.

In step 1029, data transmission is performed, via the target beam, on the one or the plurality of transmission units indicated by the first piece of control information.

Exemplarily, the base station may inform the terminal of the beam configurations of the plurality of transmission units by setting different scrambling sequences for different pieces of control information. In initialization, the base station may set different scrambling codes for different beams, and generate and transmit a corresponding relation between the scrambling codes and the beams to the terminal. After determining the plurality of transmission units configured for the terminal, the base station may generate a plurality of pieces of control information to be transmitted according to the plurality of transmission units, and then scramble the plurality of pieces of control information to be transmitted with the corresponding scrambling sequence. Specifically, taking the first piece of control information to be transmitted as an example, the first piece of control information to be transmitted is any one of the plurality of pieces of control information to be transmitted. After generating the first piece of control information to be transmitted, the base station may obtain one or more target beams corresponding to the plurality of transmission units indicated by the first piece of control information to be transmitted, and one target beam may correspond to one or more transmission units. Then, the base station may obtain the scrambling code of each of the plurality of target beams according to the corresponding relation between the scrambling code and the beam. generate the scrambling sequence of the first piece of control information to be transmitted according to the scrambling code of each target beam and scramble the first piece of control information to be transmitted with the scrambling sequence to obtain the first piece of control information.

After receiving the plurality of pieces of control information, the terminal may sequentially obtain the scrambling sequence of each piece of control information. According to the scrambling sequence of each piece of control information, the terminal may obtain one or more target beams corresponding to the plurality of transmission units indicated by each piece of control information, and perform data transmission, via the corresponding target beam, on the one or plurality of transmission units.

Taking the first piece of control information as an example, after receiving the first piece of control information, the terminal obtains the scrambling sequence of the first piece of control information, queries the corresponding relation between the scrambling code and the beam to obtain one or more target beams represented by the scrambling sequence, and determines, according to the mapping relation between the scrambling sequence and the transmission units agreed with the base station, the corresponding relation between the one or more target beams represented by the scrambling sequence and the plurality of transmission units indicated by the first piece of control information. That is, the terminal obtains the target beam corresponding to each of the plurality of transmission units, respectively, and perform data transmission, via the corresponding target beam, on each transmission unit.

Assuming that the terminal determines that the scrambling sequence represents the first target beam and the second target beam according to the scrambling sequence of the first piece of control information and the corresponding relation between the scrambling code and the beam, the mapping relation between the scrambling sequence and the transmission unit agreed between the base station and the terminal indicates that the scrambling code in the scrambling sequence has a one-to-one correspondence with the transmission unit in a writing sequence, and the first piece of control information indicates that the base station allocates the first transmission unit and the second transmission unit for the terminal for data reception or transmission, then the terminal may determine that the first transmission unit corresponds to the first target beam and the second transmission unit corresponds to the second target beam. Thus, the terminal may receive or transmit data, via the first target beam, on the first transmission unit and receive or transmit data, via the second target beam, on the second transmission unit.

Optionally, the base station may transmit the corresponding relation between the scrambling code and the beam and the mapping relation between the scrambling sequence and the transmission unit to the terminal via an RRC signaling, a MAC CE, or a physical layer signaling. During the data transmission process by the terminal, the base station may update and transmit the corresponding relation between the scrambling code and the beam and the mapping relation between the scrambling sequence and the transmission unit according to the specific situation to the terminal. In practical applications, the terminal may agree with the base station on the corresponding relation between the scrambling code and the beam and the mapping relation between the scrambling sequence and the transmission unit when initially accessing the network and store the relations, or the terminal may preset the corresponding relation between the scrambling code and the beam and the mapping relation between the scrambling sequence and the transmission unit when leaving the factory, which is not limited in the embodiments of the present disclosure.

With the data transmission method provided in the embodiments of the present disclosure, the terminal can obtain, according to a plurality of pieces of control information transmitted by a terminal, a plurality of target beams corresponding to a plurality of transmission units indicated by each piece of control information through a plurality of preset beam acquisition rules, to perform data transmission according to the plurality of target beams, thereby implementing a multi-beam data transmission solution. Thus, the probability of packet loss during data transmission is reduced, and the reliability of data transmission is increased.

Base Station Side

Figure 2A:
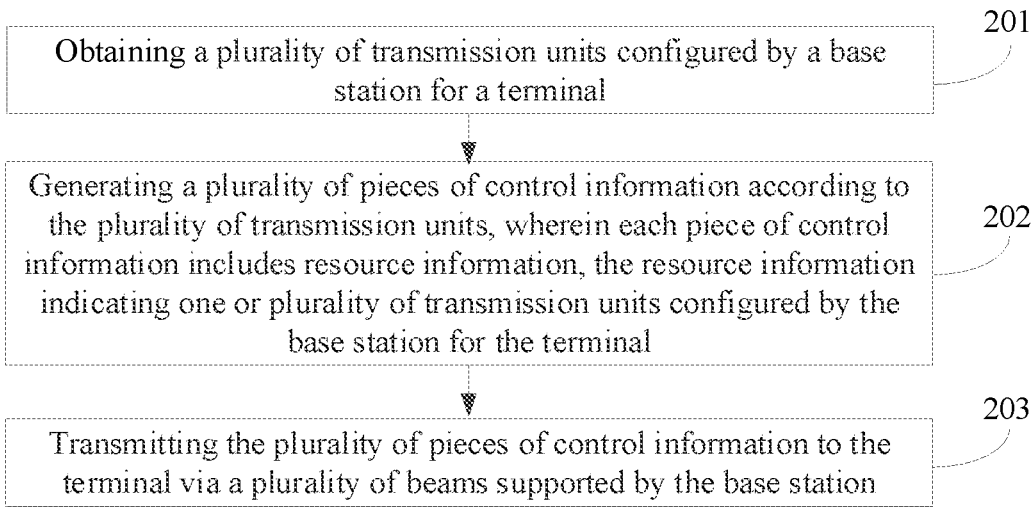
FIG. 2*a* is a flow chart of a data transmission method according to exemplary embodiment.

FIG. 2a is a flow chart of a data transmission method according to an exemplary embodiment, and the data transmission method is applied to a base station. As illustrated in FIG. 2a, the method includes following steps 201 to 203.

In step 201, a plurality of transmission units configured by a base station for a terminal are obtained.

In step 202, a plurality of pieces of control information are generated according to the plurality of transmission units, wherein each piece of control information includes resource information, the resource information indicating one or plurality of transmission units configured by the base station for the terminal.

In step 203, the plurality of pieces of control information are transmitted to the terminal via a plurality of beams supported by the base station.

Exemplarily, the base station supports a plurality of beams, and a plurality of terminals may access each beam. Therefore, the base station needs to configure the transmission unit for data transmission for each terminal according to the requirement of each terminal or according to the number of uplink and downlink data packets. Optionally, the base station may configure a plurality of transmission units for the terminal according to a preset resource configuration policy. For example, the base station configures, according to the number of data packets to be transmitted to the terminal and the number of terminals currently accessed to each supported beam, the transmission unit for the terminal in the time-frequency resource of the beam having a smaller number of accessed terminals.

After obtaining the plurality of transmission units, the base station may generate a plurality of pieces of control information according to the plurality of transmission units, where each piece of control information at least indicates one transmission unit, and the control information may be used for allocating uplink communication resources or downlink communication resources.

Specifically, the control information may include resource information, which indicates one or a plurality of transmission units configured by the base station for the terminal. For example, the control information may include a unit identifier of one or more transmission units, the unit identifier being used to identify one or a plurality of transmission units configured by the base station for the terminal for data transmission. That is, the unit identifier of the one or a plurality of transmission units constitutes the resource information scheduled by the control information. After obtaining the plurality of pieces of control information, the base station may use a plurality of beams to transmit the plurality of pieces of control information. Each beam transmits one piece of control information.

In the technical solutions provided in the embodiments of the present disclosure, the base station can transmit a plurality of pieces of control information to a terminal via a plurality of supported beams according to the requirements of the terminal, so that the terminal can obtain a plurality of target beams corresponding to a plurality of transmission units indicated by each piece of control information according to the plurality of pieces of control information, and thus perform data transmission according to the plurality of target beams, thereby implementing a multi-beam data transmission solution. Thus, the probability of packet loss during data transmission is reduced, and the reliability of data transmission is increased.

Figure 2B:
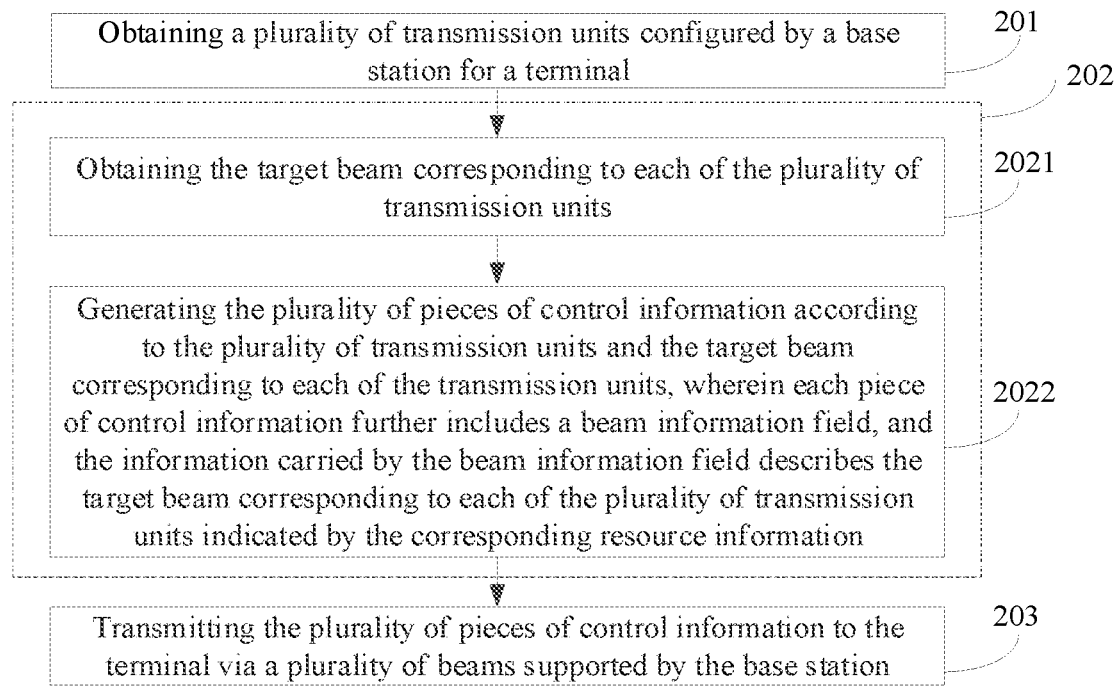
FIG. 2*b* is a flow chart of a data transmission method according to an exemplary embodiment.

In an embodiment, as illustrated in FIG. 2b, in step 202, generating the plurality of pieces of control information according to the plurality of transmission units may be implemented by steps 2021 and 2022.

In step 2021, the target beam corresponding to each of the plurality of transmission units is obtained.

In step 2022, the plurality of pieces of control information is generated according to the plurality of transmission units and the target beam corresponding to each of the transmission units. Each piece of control information further includes a beam information field, and the information carried by the beam information field describes the target beam corresponding to each of the plurality of transmission units indicated by the corresponding resource information.

Taking an example in which the control information is DCI, the base station and the terminal may agree in advance on the length and position of the beam information field in the according to the DCI protocol. After configuring the plurality of transmission units for the terminal, the base station may firstly determine the target beam corresponding to each of the plurality of transmission units, then generate a plurality of DCIs, and write information with a preset length at a preset position of the beam information field of each DCI. The information describes a corresponding relation between the plurality of transmission units indicated by the DCI and the target beams.

Figure 2C:
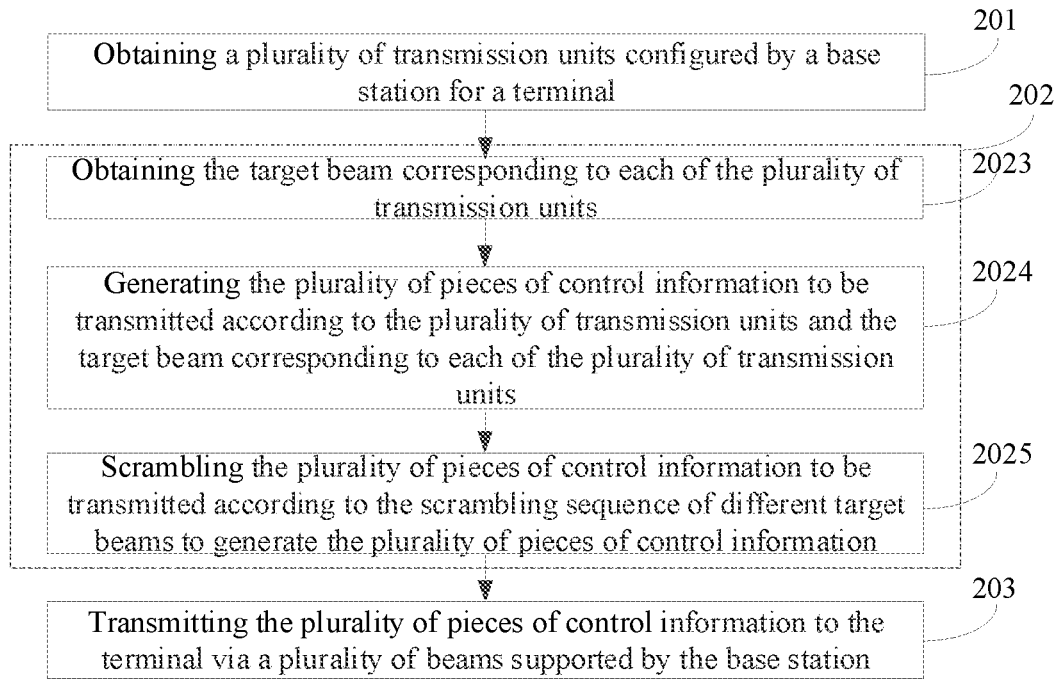
FIG. 2*c* is a flow chart of a data transmission method according to an exemplary embodiment.

In an embodiment, as illustrated in FIG. 2c, in step 202, generating the plurality of pieces of control information according to the plurality of transmission units may be implemented by steps 2023 to 2025.

In step 2023, the target beam corresponding to each of the plurality of transmission units is obtained.

In step 2024, the plurality of pieces of control information to be transmitted is generated according to the plurality of transmission units and the target beam corresponding to each of the plurality of transmission units.

In step 2025, the plurality of pieces of control information to be transmitted is scrambled according to the scrambling sequence of different target beams to generate the plurality, of pieces of control information.

When or after the terminal accesses the system, the base station may transmit the corresponding relation between the scrambling code and the beam to the terminal. The corresponding relation describes different scrambling codes corresponding to different beams.

After configuring the plurality of transmission units for the terminal, the base station may generate a plurality of pieces of control information to be transmitted according to the plurality of transmission units, and obtain the scrambling sequence of each piece of the control information to be transmitted according to the corresponding relation between the scrambling code and the beam and the plurality of transmission units indicated by each of the plurality of pieces of control information to be transmitted, thereby scrambling the plurality of pieces of control information to be transmitted with the corresponding scrambling sequence to obtain the plurality of pieces of control information.

Specifically, taking the first piece of control information to be transmitted as an example, the first piece of control information to be transmitted is any one of the plurality of pieces of control information to be transmitted. After generating the first piece of control information to be transmitted, the base station may obtain the plurality of target beams corresponding to the plurality of transmission units indicated by the first piece of control information to be transmitted, and one target beam may correspond to one or more transmission units. Then, the base station may obtain the scrambling code of each of the plurality of target beams according to the corresponding relation between the scrambling code and the beam, generate the scrambling sequence of the first piece of control information to be transmitted according to the scrambling code of each target beam, and scramble the first piece of control information to be transmitted with the scrambling code to obtain the first piece of control information.

In practical applications, the base station can also generate the control information to be transmitted according to the target beam corresponding to the plurality of transmission units. That is, the transmission units indicated by different piece of control information to be transmitted are different, and the target beams corresponding to the plurality of transmission units indicated by the same piece of candidate control information are the same, so that the base station can scramble the plurality of pieces of control information to be transmitted according to the scrambling code of the target beam corresponding to each piece of control information to be transmitted.

For example, the base station configures four transmission units for the terminal, wherein the first transmission unit and the second transmission unit correspond to the first target beam, and the third transmission unit and the fourth transmission unit correspond to the second target beam. The base station may generate the first piece of control information to be transmitted according to the first transmission unit and the second transmission unit, and use the scrambling code corresponding to the first target beam to scramble the first piece of control information to be transmitted to generate the first piece of control information. The scrambling code corresponding to the first target beam is the scrambling sequence of the first piece of control information to be transmitted. The base station may generate the second piece of control information to be transmitted according to the third transmission unit and the fourth transmission unit, and use the scrambling code corresponding to the second target beam to scramble the second piece of control information to be transmitted to generate the second piece of control information. The scrambling code corresponding to the second target beam is the scrambling sequence of the second piece of control information to be transmitted. After receiving the first piece of control information, the terminal may determine that the first transmission unit and the second transmission unit correspond to the first target beam according to the scrambling sequence of the first piece of control information, and determine that the third transmission unit and the fourth transmission unit correspond to the second target beam according to the scrambling sequence of the second piece of control information, thereby using the first target beam and the second target beam to implement data transmission.

Figure 2D:
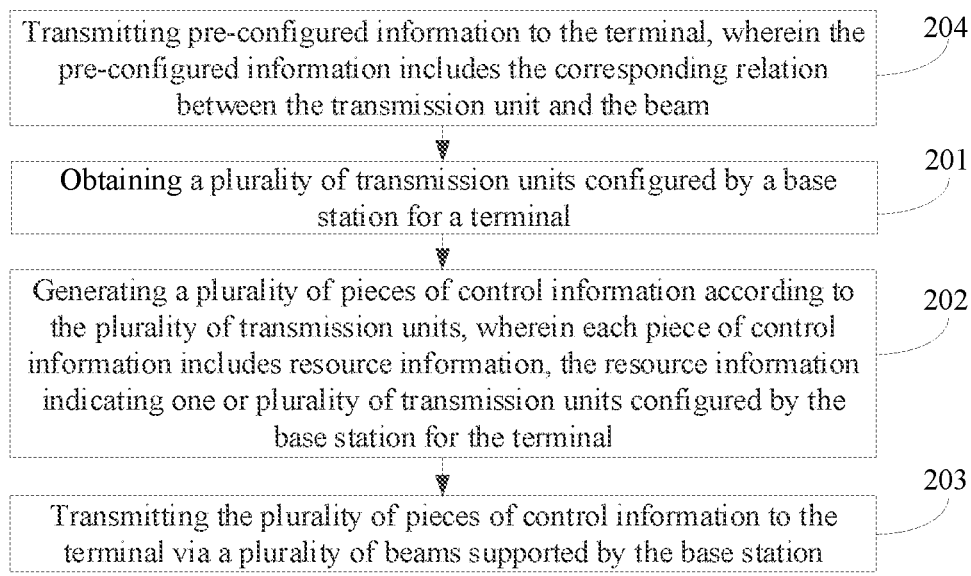
FIG. 2*d* is a flow chart of a data transmission method according to an exemplary embodiment.

In an embodiment, as illustrated in FIG. 2d, the method further includes step 204.

In step 204, pre-configured information is transmitted to the terminal, and the pre-configured information includes the corresponding relation between the transmission unit and the beam.

In initialization, the base station may integrate all the supported beams, use all the transmission units to establish the corresponding relation between the transmission units and the beams. One beam may correspond to one or more transmission units. When or after the terminal accesses the system, the base station may transmit pre-configured information to the terminal. The pre-configured information includes the corresponding relation between the transmission unit and the beam, so that the terminal can obtain, according to the corresponding relation between the transmission unit and the beam, the target beam corresponding to each of the plurality of transmission units indicated by the plurality of pieces of control information.

Optionally, the base station may transmit the pre-configured information to the terminal via an RRC signaling, a MAC CE, or a physical layer signaling.

In the technical solutions provided in the embodiments of the present disclosure, the base station can transmit a plurality of pieces of control information to a terminal via a plurality, of supported beams according to the requirements of the terminal, and inform the terminal, in multiple ways, beams corresponding to a plurality of transmission units indicated by each piece of control information in the plurality of pieces of control information, so that the terminal can perform data transmission on the plurality of transmission units according to the plurality of beams, thereby implementing a multi-beam data transmission solution. Thus, the probability of packet loss during data transmission is reduced, and the reliability of data transmission is increased.

The technical solutions in this embodiment will be described below with specific embodiments.

Embodiment 1

Figure 3:
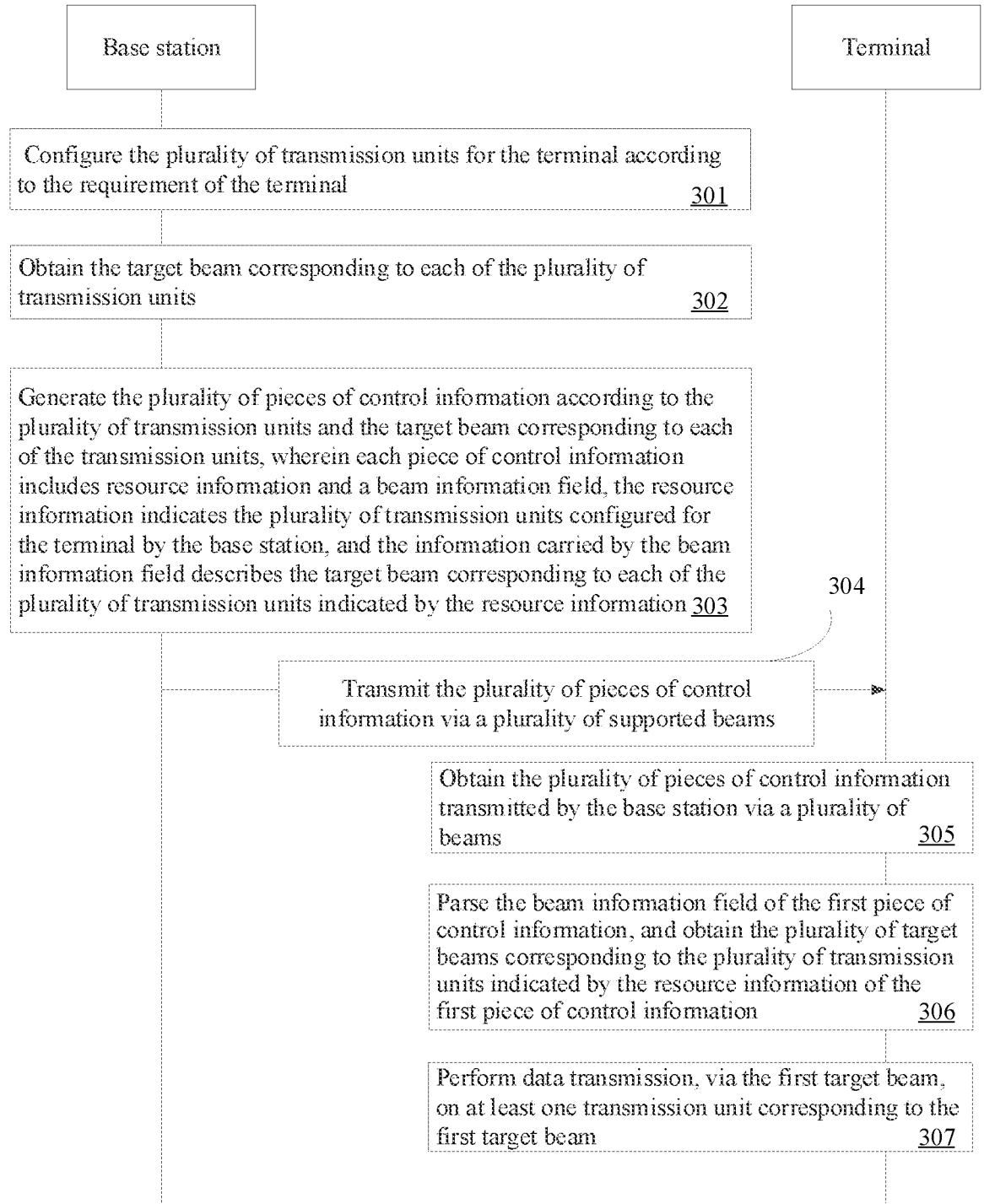
FIG. 3 is an interaction diagram of a data transmission method according to an exemplary embodiment.

FIG. 3 is an interaction diagram of a data transmission method according to an exemplary embodiment. As illustrated in FIG. 3, the method includes following steps 301 to 307.

In step 301, the base station configures the plurality of transmission units for the terminal according to the requirement of the terminal.

In step 302, the base station obtains the target beam corresponding to each of the plurality of transmission units.

In step 303, the base station generates the plurality of pieces of control information according to the plurality of transmission units and the target beam corresponding to each of the transmission units. Each piece of control information includes resource information and a beam information field. The resource information indicates the plurality of transmission units configured for the terminal by the base station, and the information carried by the beam information field describes the target beam corresponding to each of the plurality of transmission units indicated by the resource information.

In step 304, the base station transmits the plurality of pieces of control information to the terminal via a plurality of supported beams.

Different beams transmit different pieces of control information.

In step 305, the terminal obtains the plurality of pieces of control information transmitted by the base station via multiple beams.

In step 306, the terminal parses the beam information field of the first piece of control information, and obtains the plurality of target beams corresponding to the plurality of transmission units indicated by the resource information of the first piece of control information.

The first piece of control information is any one of the plurality of pieces of control information.

In step 307, the terminal performs data transmission, via the first target beam, on at least one transmission unit corresponding to the first target beam With the data transmission method provided in the embodiments of the present disclosure, the terminal can obtain a plurality of target beams corresponding to a plurality of transmission units indicated by each piece of control information according to the beam information field of each piece of control information, and perform data transmission according to the plurality of target beams, thereby implementing a multi-beam data transmission solution. Thus, the probability of packet loss during data transmission is reduced, and the reliability of data transmission is increased.

Embodiment 2

Figure 4:
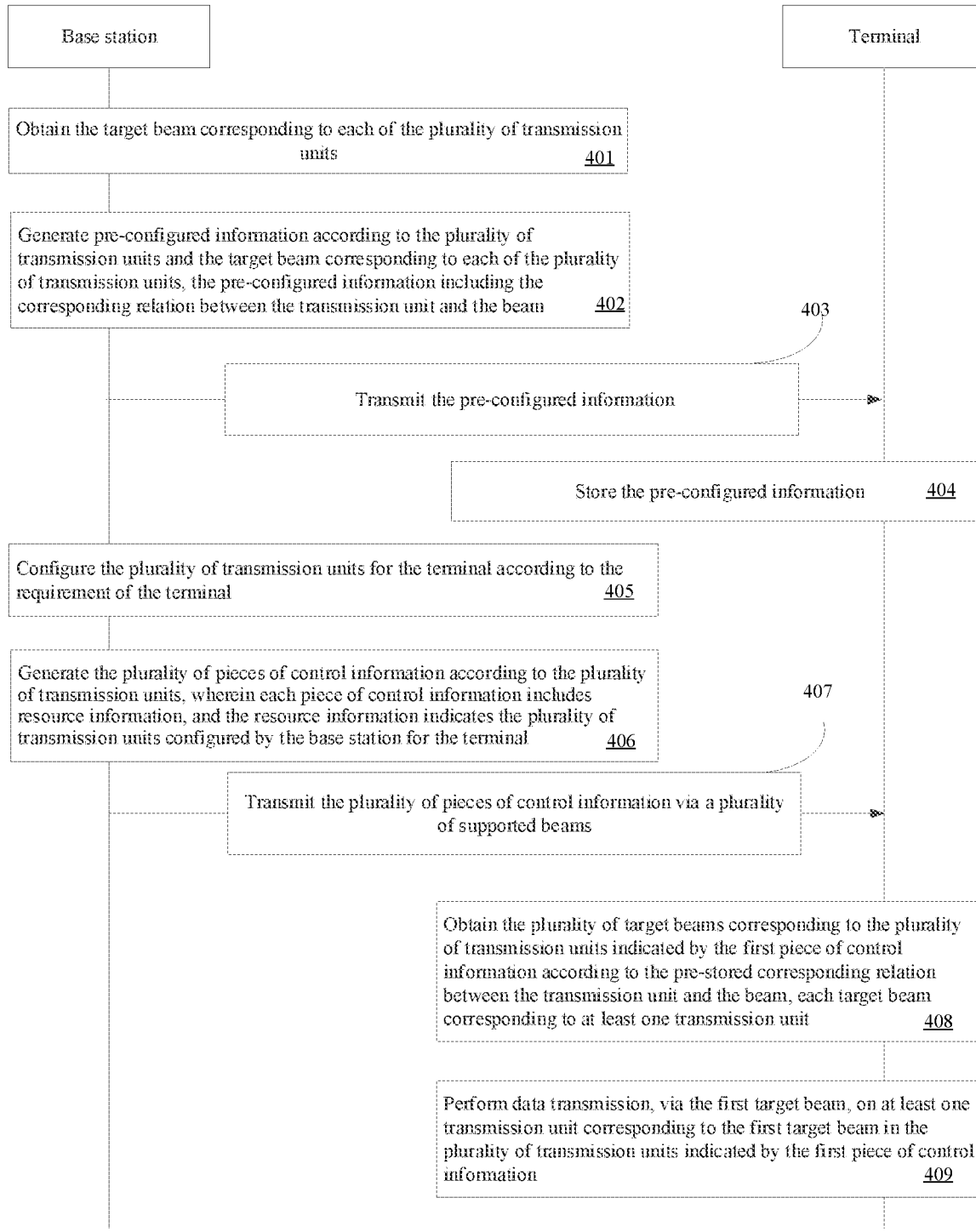
FIG. 4 is an interaction diagram of a data transmission method according to an exemplary embodiment.

FIG. 4 is an interaction diagram of a data transmission method according to an exemplary embodiment. As illustrated in FIG. 4, the method includes following steps 401 to 409.

In step 401, the base station obtains the target beam corresponding to each of the plurality of transmission units.

In step 402, the base station generates pre-configured information according to the plurality of transmission units and the target beam corresponding to each of the plurality of transmission units, the pre-configured information including the corresponding relation between the transmission unit and the beam.

In step 403, the base station transmits the pre-configured information to the terminal.

In step 404, the terminal stores the pre-configured information.

In step 405, the base station configures the plurality of transmission units for the terminal according to the requirement of the terminal.

In step 406, the base station generates the plurality of pieces of control information according to the plurality of transmission units. Each piece of control information includes resource information, and the resource information indicates the plurality of transmission units configured by the base station for the terminal.

In step 407, the base station transmits the plurality of pieces of control information to the terminal via a plurality of supported beams.

Each beam transmits a piece of control information.

In step 408, the terminal obtains the plurality of target beams corresponding to the plurality of transmission units indicated by the first piece of control information according to the pre-stored corresponding relation between the transmission unit and the beam, each target beam corresponding to at least one transmission unit.

The first piece of control information is any one of the plurality of pieces of control information.

In step 409, the terminal u performs data transmission, via the first target beam, on at least one transmission unit corresponding to the first target beam in the plurality of transmission units indicated by the first piece of control information.

The first target beam is any one of the plurality of target beams.

With the data transmission method provided in the embodiments of the present disclosure, the terminal can obtain a plurality of target beams corresponding to a plurality of transmission units indicated by each piece of control information according to a pre-stored corresponding relation between a transmission unit and a beam, and perform data transmission according to the plurality of target beams, thereby implementing a multi-beam data transmission solution. Thus, the probability of packet loss during data transmission is reduced, and the reliability of data transmission is increased.

Embodiment 3

Figure 5:
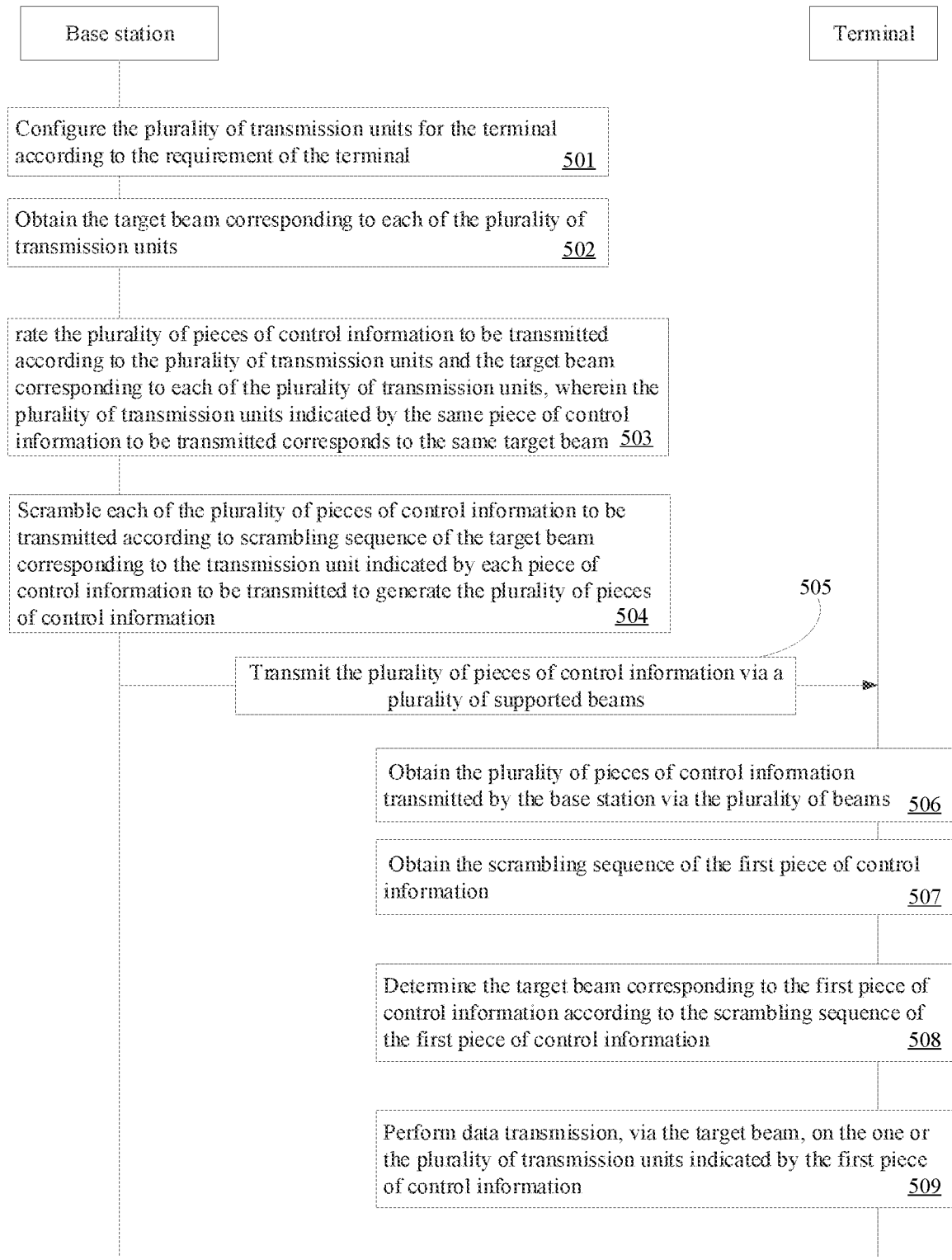
FIG. 5 is an interaction diagram of a data transmission method according to an exemplary embodiment.

FIG. 5 is an interaction diagram of a data transmission method according to an exemplary embodiment. As illustrated in FIG. 5, the method includes following steps 501 to 510.

In step 501, the base station configures the plurality of transmission units for the terminal according to the requirement of the terminal.

In step 502, the base station obtains the target beam corresponding to each of the plurality of transmission units.

In step 503, the base station generates the plurality of pieces of control information to be transmitted according to the plurality of transmission units and the target beam corresponding to each of the plurality of transmission units.

The plurality of transmission units indicated by the same piece of control information to be transmitted corresponds to the same target beam.

In step 504, the base station scrambles each of the plurality of pieces of control information to be transmitted according to scrambling sequence of the target beam corresponding to the transmission unit indicated by each piece of control information to be transmitted to generate the plurality of pieces of control information.

In step 505, the base station transmits the plurality of pieces of control information to the terminal via a plurality of supported beams.

Each beam transmits a piece of control information.

In step 506, the terminal obtains the plurality of pieces of control information transmitted by the base station via the plurality of beams.

In step 507, the terminal obtains the scrambling sequence of the first piece of control information.

The first piece of control information is any one of the plurality of pieces of control information.

In step 508, the terminal determines the target beam corresponding to the first piece of control information according to the scrambling sequence of the first piece of control information.

In step 509, the terminal performs data transmission, via the target beam, on the one or the plurality of transmission units indicated by the first piece of control information.

With the data transmission method provided in the embodiments of the present disclosure, the terminal can obtain a plurality of target beams corresponding to a plurality of transmission units indicated by each piece of control information according to the scrambling sequence of each piece of control information, and perform data transmission according to the plurality of target beams, thereby implementing a multi-beam data transmission solution. Thus, the probability of packet loss during data transmission is reduced, and the reliability of data transmission is increased.

Embodiment 4

Figure 6:
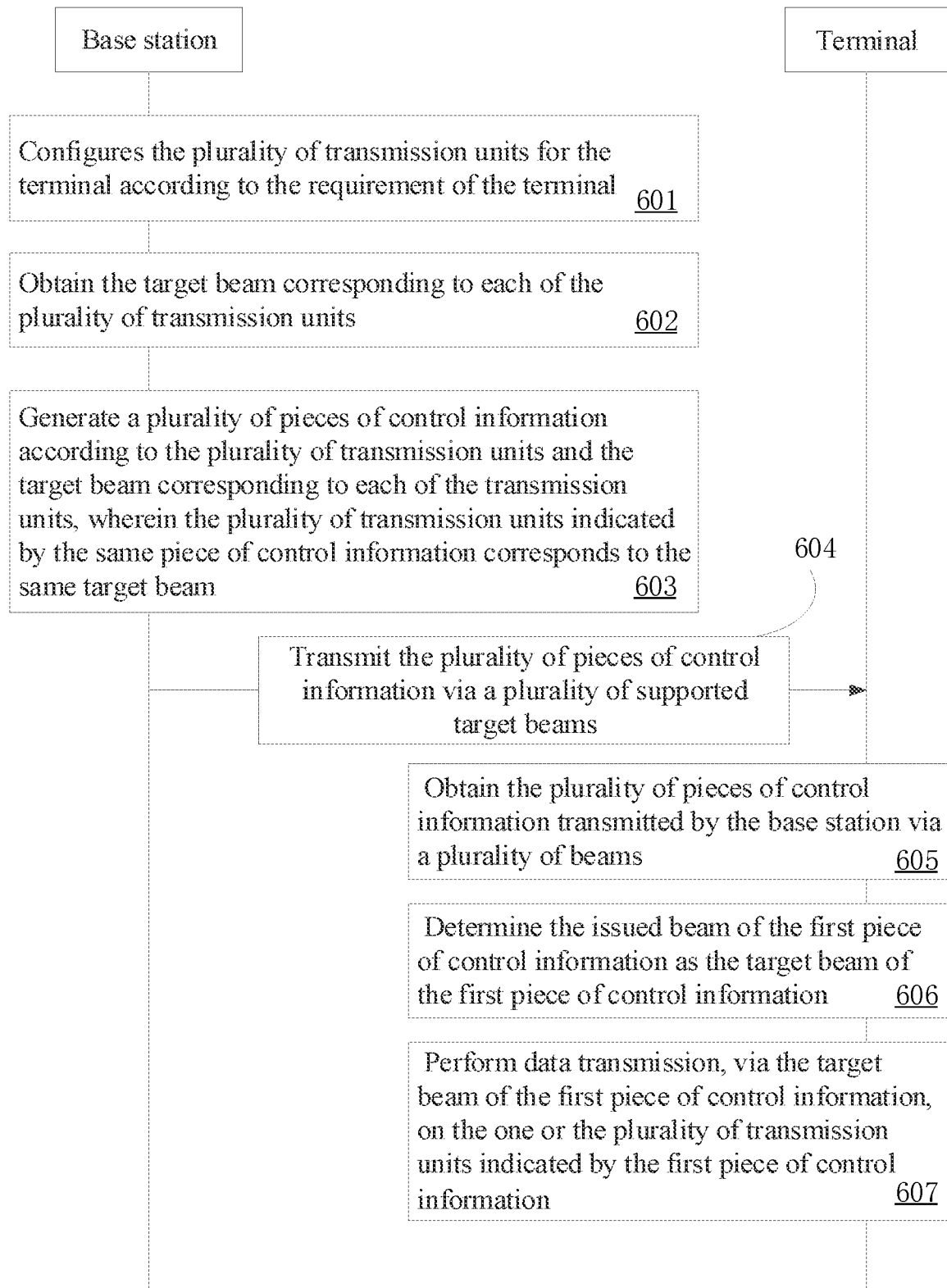
FIG. 6 is an interaction diagram of a data transmission method according to an exemplary embodiment.

FIG. 6 is an interaction diagram of a data transmission method according to an exemplary embodiment. As illustrated in FIG. 6, the method includes following steps 601 to 610.

In step 601, the base station configures the plurality of transmission units for the terminal according to the requirement of the terminal.

In step 602, the base station obtains the target beam corresponding to each of the plurality of transmission units.

In step 603, the base station generates a plurality of pieces of control information according to the plurality of transmission units and the target beam corresponding to each of the transmission units. The plurality of transmission units indicated by the same piece of control information corresponds to the same target beam.

In step 604, the base station uses the supported target beam corresponding to each piece of control information to transmit each piece of control information.

In step 605, the terminal obtains the plurality of pieces of control information transmitted by the base station via a plurality of beams.

In step 606, the terminal obtains the issued beam of the first piece of control information as the target beam of the first piece of control information.

In step 607, the terminal performs data transmission, via the target beam of the first piece of control information, on the one or the plurality of transmission units indicated by the first piece of control information.

With the data transmission method provided in the embodiments of the present disclosure, the terminal can obtain a plurality of target beams corresponding to a plurality of transmission units indicated by each piece of control information according to an issued beam of each piece of control information, and perform data transmission according to the plurality of target beams, thereby implementing a multi-beam data transmission solution. Thus, the probability of packet loss during data transmission is reduced, and the reliability of data transmission is increased.

The followings are embodiments of the apparatus of the present disclosure, which may be configured to perform the embodiments of the method of the present disclosure.

Figure 7A:
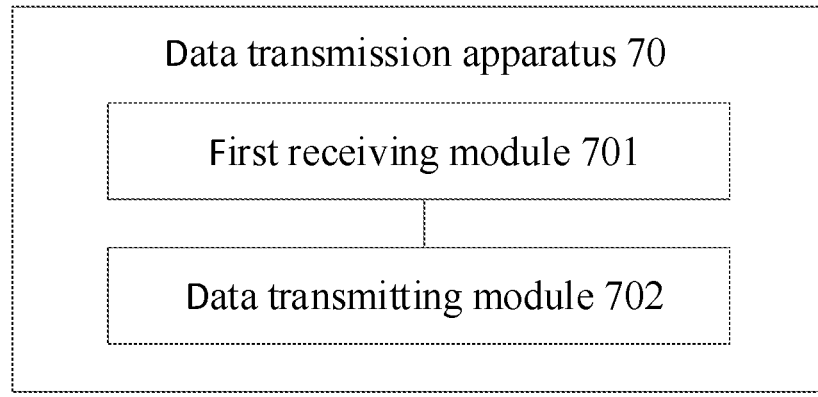
FIG. 7*a* is a schematic structural diagram illustrating a data transmission apparatus according to an exemplary embodiment.

FIG. 7a is a schematic structural diagram illustrating a data transmission apparatus according to an exemplary embodiment. The apparatus 70 may be implemented by software, hardware or a combination of the both into a part of or whole of an electronic device. As illustrated in FIG. 7a, the data transmission apparatus 70 includes a first receiving module 701 and a data transmitting module 702.

The first receiving module 701 is configured to receive a plurality of pieces of control information transmitted by a base station via a plurality of beams, each piece of control information including resource information, the resource information indicating one or a plurality of transmission units configured by the base station for a terminal.

The data transmitting module 702 is configured to perform data transmission, via the plurality of beams, on the plurality of transmission units indicated by the plurality of pieces of control information according to the plurality of pieces of control information.

Figure 7B:
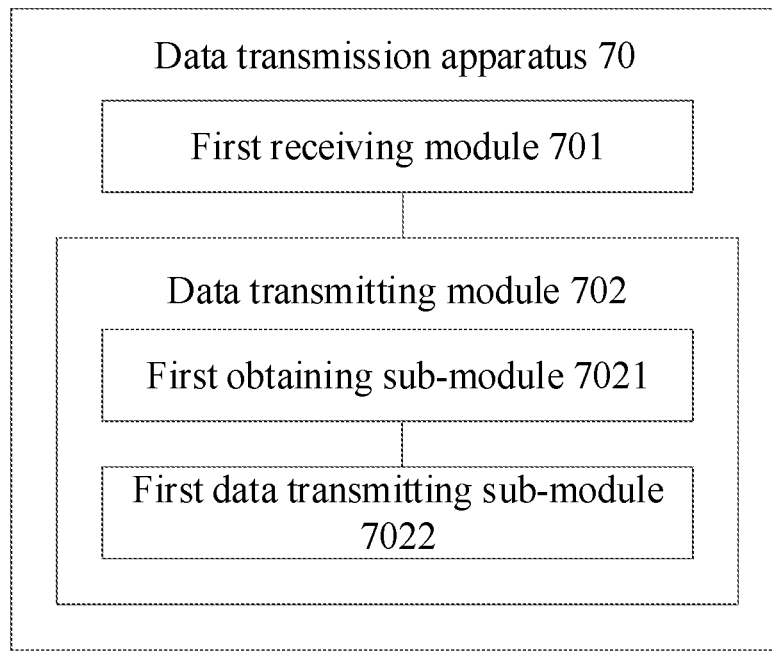
FIG. 7*b* is a schematic structural diagram illustrating a data transmission apparatus according to an exemplary embodiment.

In an embodiment, as illustrated in FIG. 7b, the data transmitting module 702 includes a first obtaining sub-module 7021 and a first data transmitting sub-module 7022.

The first obtaining sub-module 7021 is configured to obtain a plurality of target beams corresponding to a plurality of transmission units indicated by a first piece of control information according to a pre-stored corresponding relation between a transmission unit and a beam, each target beam corresponding to at least one transmission unit, and the first piece of control information being any one of the plurality of pieces of control information.

The first data transmitting sub-module 7022 is configured to perform data transmission, via a first target beam, on at least one transmission unit corresponding to the first target beam among the plurality of transmission units indicated by the first piece of control information, the first target beam being any one of the plurality of target beams.

Figure 7C:
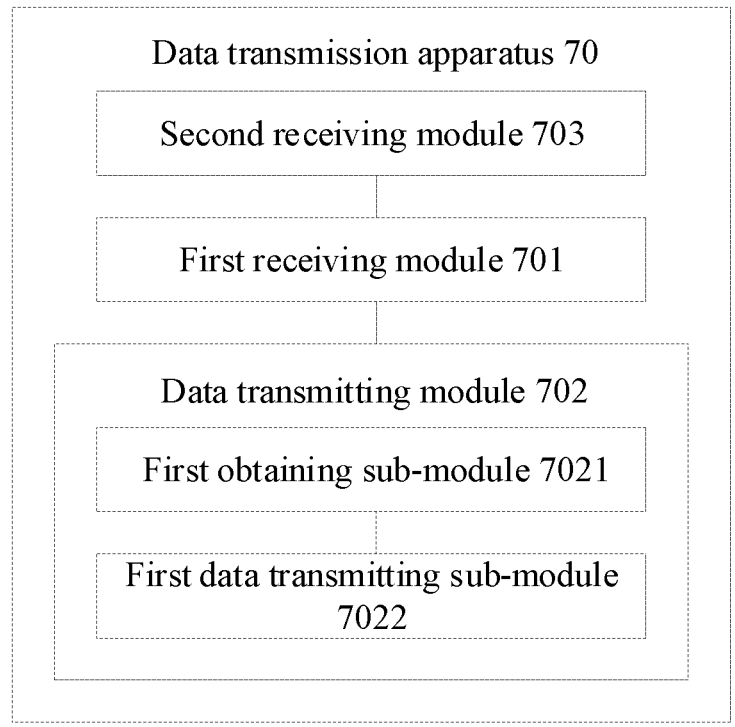
FIG. 7*c* is a schematic structural diagram illustrating a data transmission apparatus according to an exemplary embodiment.

In an embodiment, as illustrated in FIG. 7c, the apparatus 70 further includes a second receiving module 703 configured to receive pre-configured information sent by the base station, the pre-configured information including the corresponding relation between the transmission unit and the beam.

Figure 7D:
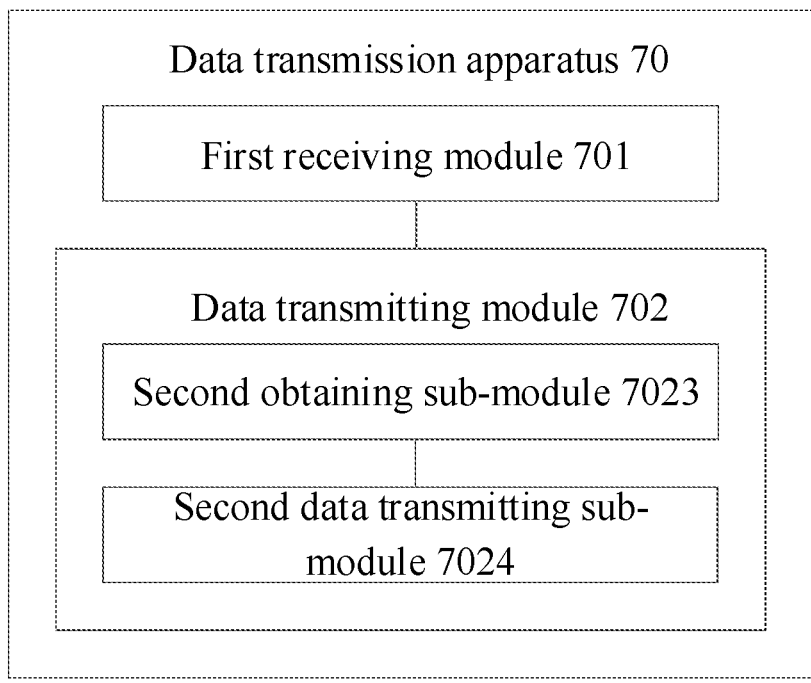
FIG. 7*d* is a schematic structural diagram illustrating a data transmission apparatus according to an exemplary embodiment.

In an embodiment, as illustrated in FIG. 7d, the data transmitting module 702 includes a second obtaining sub-module 7023 and a second data transmitting sub-module 7024.

The second obtaining sub-module 7023 is configured to determine the beam of the first piece of control information transmitted by the base station as the target beam corresponding to the first piece of control information, the first piece of control information being any one of the plurality of pieces of control information.

The second data transmitting sub-module 7024 is configured to perform data transmission, via the target beam, on one or a plurality of transmission units indicated by the first piece of control information.

Figure 7E:
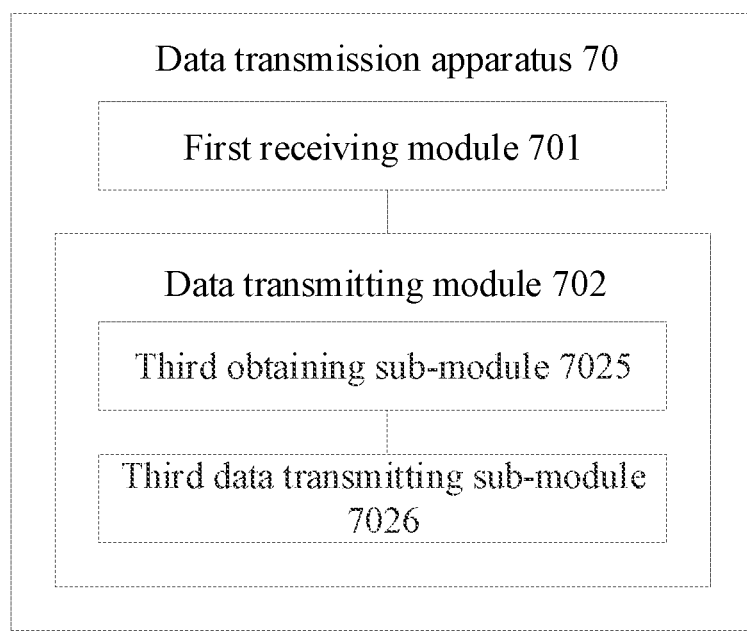
FIG. 7*e* is a schematic structural diagram illustrating a data transmission apparatus according to an exemplary embodiment.

In an embodiment, each piece of control information includes a beam information field, and information carried by the beam information field describes the target beam corresponding to each of the plurality of transmission units indicated by the corresponding resource information. As illustrated in FIG. 7e, the data transmitting module 702 includes a third obtaining sub-module 7025 and a third data transmitting sub-module 7026.

The third obtaining sub-module 7025 is configured to parse a beam information field of the first piece of control information, and obtain one or a plurality of target beams corresponding to the plurality of transmission units indicated by the first piece of control information, the first piece of control information being any one of the plurality of pieces of control information.

The third data transmitting sub-module 7026 is configured to perform data transmission, via the first target beam, on the transmission unit corresponding to the first target beam, the first target beam being any one of the plurality of target beams.

Figure 7F:
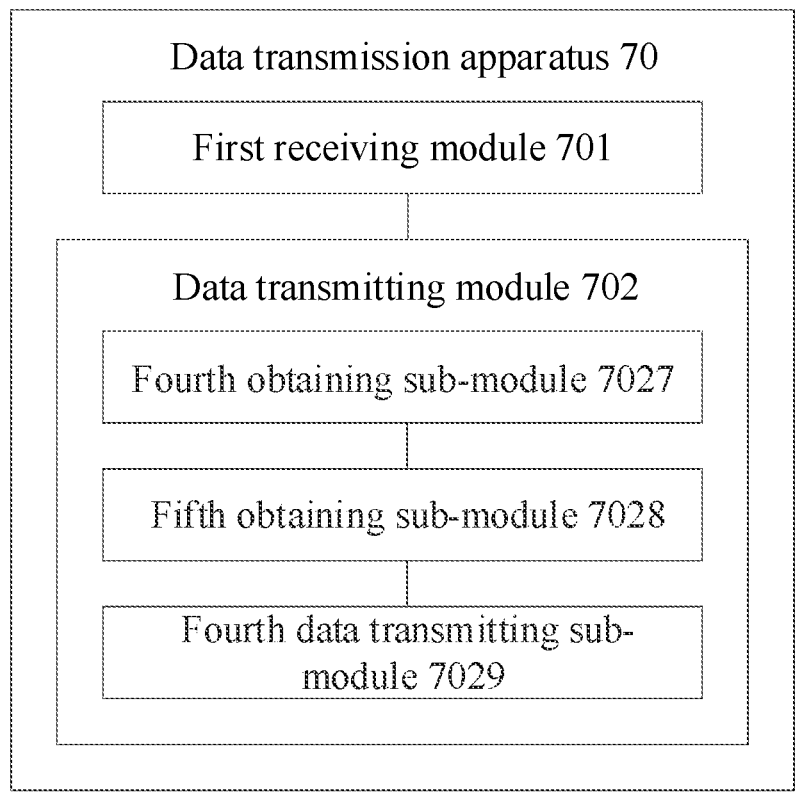
FIG. 7*f* is a schematic structural diagram illustrating a data transmission apparatus according to an exemplary embodiment.

In an embodiment, as illustrated in FIG. 7f, the data transmitting module 702 includes a fourth obtaining sub-module 7027, a fifth obtaining sub-module 7028, and a fourth data transmitting sub-module 7029.

The fourth obtaining sub-module 7027 is configured to obtain the scrambling sequence of the first piece of control information, the first piece of control information being any one of the plurality of pieces of control information.

The fifth obtaining sub-module 7028 is configured to obtain, according to the scrambling sequence, the target beam corresponding to each of the plurality of transmission units indicated by the first piece of control information.

The fourth data transmitting sub-module 7029 is configured to perform data transmission, via the target beam, on one or a plurality of transmission units indicated by the first piece of control information.

With the data transmission apparatus provided in the embodiments of the present disclosure, the apparatus can obtain, according to the plurality of pieces of control information transmitted by a base station, a plurality of target beams corresponding to a plurality of transmission units indicated by each piece of control information based on a plurality of preset beam acquisition rules, and perform data transmission according to the plurality of target beams, thereby implementing a multi-beam data transmission solution. Thus, the probability of packet loss during data transmission is reduced, and the reliability of data transmission is increased.

Figure 8A:
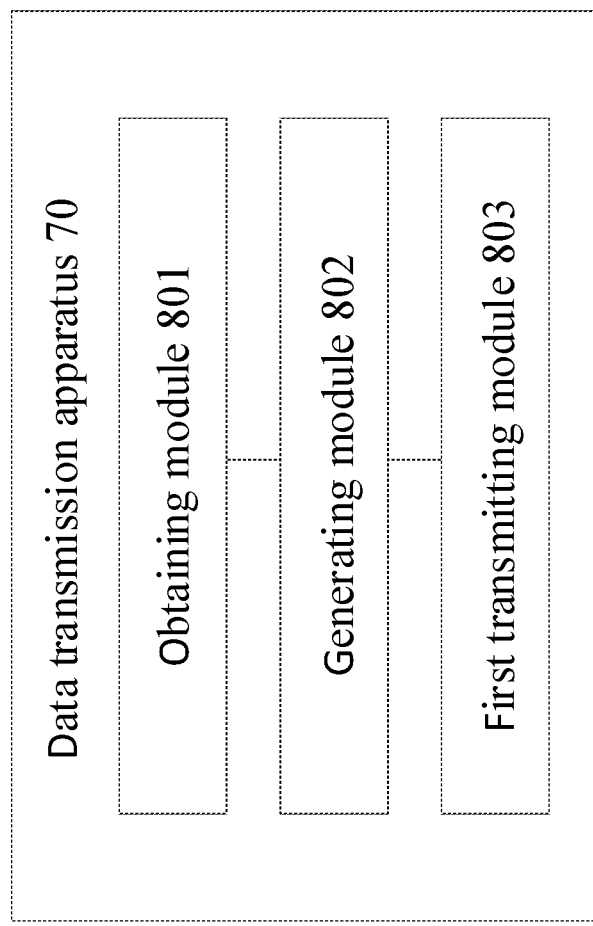
FIG. 8*a* is a schematic structural diagram illustrating a data transmission apparatus according to an exemplary embodiment.

FIG. 8*a* is a schematic structural diagram illustrating a data transmission apparatus according to an exemplary embodiment. The apparatus 70 may be implemented by software, hardware or a combination of the both into a part of or whole of an electronic device. As illustrated in FIG. 8*a*, the data transmission apparatus 80 includes an obtaining module 801, a generating module 802 and a first transmitting module 803.

The obtaining module 801 is configured to obtain a plurality of transmission units configured by a base station for a terminal.

The generating module 802 is configured to generate a plurality of pieces of control information according to the plurality of transmission units, each piece of control information including resource information, the resource information indicating one or a plurality of transmission units configured by the base station for the terminal.

The first transmitting module 803 is configured to transmit the plurality of pieces of control information to the terminal, via a plurality of beams supported by the base station.

Figure 8B:
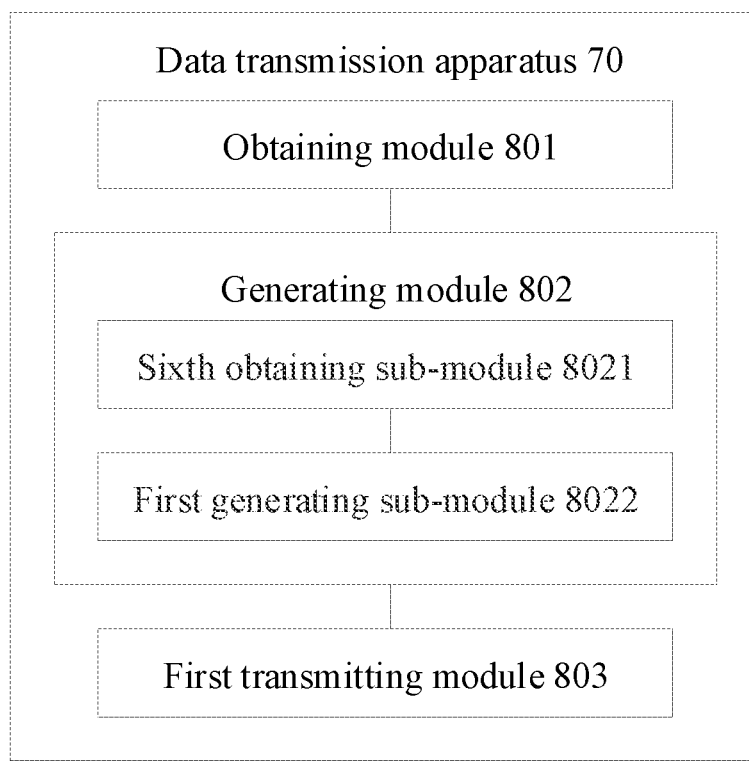
FIG. 8*b* is a schematic structural diagram illustrating a data transmission apparatus according to an exemplary embodiment.

In an embodiment, as illustrated in FIG. 8*b*, the generating module 802 includes a sixth obtaining sub-module 8021 and a first generating sub-module 8022.

The sixth obtaining sub-module 8021 is configured to obtain the target beam corresponding to each of the plurality of transmission units.

The first generating sub-module 8022 is configured to generate the plurality of pieces of control information according to the plurality of transmission units and the target beam corresponding to each of the transmission units, wherein each piece of control information includes a beam information field, and the information carried by the beam information field describes the target beam corresponding to each of the plurality of transmission units indicated by the corresponding resource information.

Figure 8C:
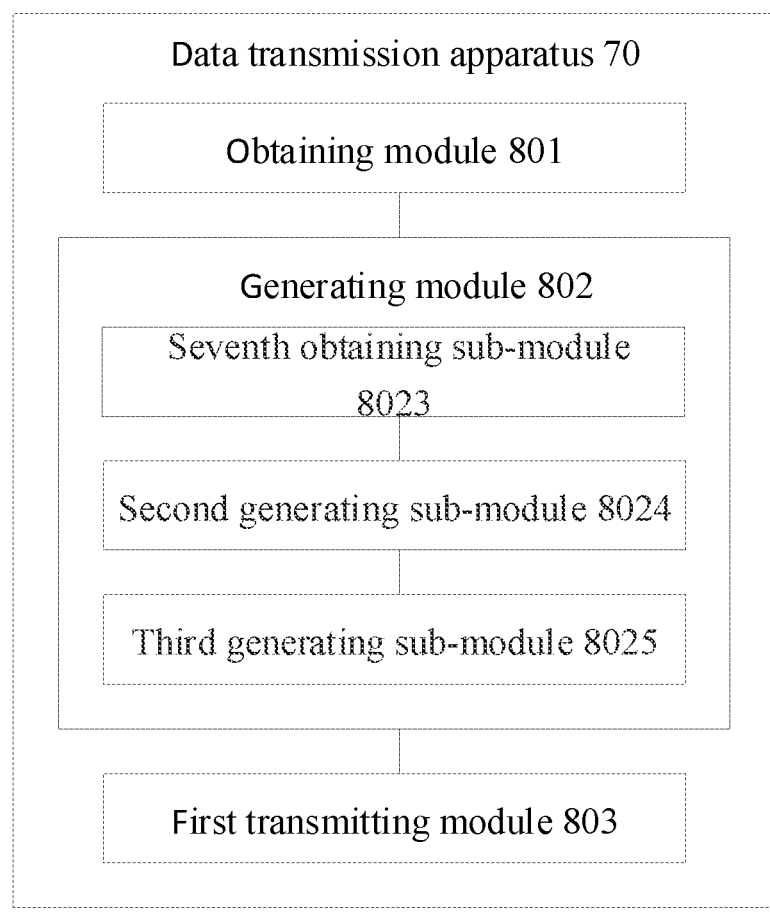
FIG. 8*c* is a schematic structural diagram illustrating a data transmission apparatus according to an exemplary embodiment.

In an embodiment, as illustrated in FIG. 8*c*, the generating module 802 includes a seventh obtaining sub-module 8023, a second generating sub-module 8024, and a third generating sub-module 8025.

The seventh obtaining sub-module 8023 is configured to obtain the target beam corresponding to each of the plurality of transmission units.

The second generating sub-module 8024 is configured to generate a plurality of pieces of control information to be transmitted according to the plurality of transmission units and the target beam corresponding to each of the transmission unit.

The third generating sub-module 8025 is configured to scramble the plurality of pieces of control information to be transmitted according to the scrambling sequence of different target beams to generate the plurality of pieces of control information.

Figure 8D:
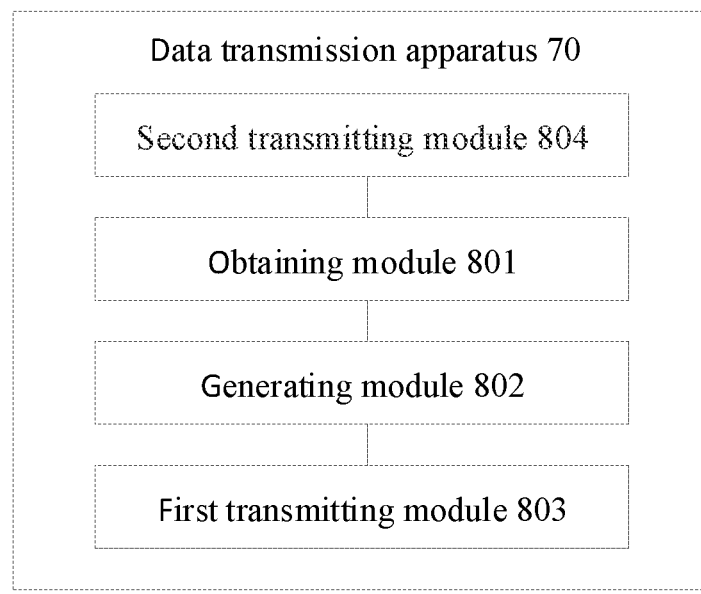
FIG. 8*d* is a schematic structural diagram illustrating a data transmission apparatus according to an exemplary embodiment.

In an embodiment, as illustrated in FIG. 8*d*, the apparatus 80 further includes a second transmitting module 804. The second transmitting module 804 is configured to transmit pre-configured information to the terminal, wherein the pre-configured information includes the corresponding relation between the transmission unit and the beam, so that the terminal obtains, according to the corresponding relation between the transmission unit and the beam, the target beam corresponding to each of the plurality of transmission units indicated by the plurality of pieces of control information.

With the data transmission apparatus provided in the embodiments of the present disclosure, the apparatus can transmit a plurality of pieces of control information to a terminal via a plurality of supported beams according to the requirements of the terminal, and inform the terminal, in multiple ways, beams corresponding to a plurality of transmission units indicated by each piece of control information in the plurality of pieces of control information, so that the terminal can perform data transmission on the plurality of transmission units according to the plurality of beams, thereby implementing a multi-beam data transmission solution. Thus, the probability of packet loss during data transmission is reduced, and the reliability of data transmission is increased.

An embodiment of the present disclosure provides a data transmission apparatus. The apparatus includes:
 a first processor; and
 a first memory configured to store instructions executable by the first processor,
 wherein the first processor is configured to:
 receive a plurality of pieces of control information transmitted by a base station via a plurality of beams, each piece of control information including resource information, the resource information indicating one or a plurality of transmission units configured by the base station for a terminal; and
 perform data transmission, via the plurality of beams, on the plurality of transmission units indicated by the plurality of pieces of control information according to the plurality of pieces of control information In an embodiment, the first processor may be further configured to: obtain a plurality of target beams corresponding to a plurality of transmission units indicated by a first piece of control information according to a pre-stored corresponding relation between a transmission unit and a beam, each target beam corresponding to at least one transmission unit, and the first piece of control information being any one of the plurality of pieces of control information; and perform data transmission, via a first target beam, on at least one transmission unit corresponding to the first target beam among the plurality of transmission units indicated by the first piece of control information, the first target beam being any one of the plurality of target beams.

In an embodiment, the first processor may be further configured to: receive pre-configured information sent by the base station, the pre-configured information including the corresponding relation between the transmission unit and the beam.

In an embodiment, the first processor is further configured to determine the beam of the first piece of control information transmitted by the base station as the target beam corresponding to the first piece of control information, the first piece of control information being any one of the plurality of pieces of control information; and perform data transmission, via the target beam, on one or a plurality of transmission units indicated by the first piece of control information.

In an embodiment, each piece of control information includes a beam information field; and the information carried by the beam information field describes the target beam corresponding to each of the plurality of transmission units indicated by the corresponding resource information. The first processor is further configured to: parse a beam information field of the first piece of control information to obtain one or a plurality of target beams corresponding to the plurality of transmission units indicated by the first piece of control information, the first piece of control information being any one of the plurality of pieces of control information; and perform data transmission, via the first target beam, on the transmission unit corresponding to the first target beam, the first target beam being any one of the plurality of target beams.

In an embodiment, the first processor may be further configured to: obtain the scrambling sequence of the first piece of control information, the first piece of control information being any one of the plurality of pieces of control information; obtain, according to the scrambling sequence, the target beam corresponding to each of the plurality of transmission units indicated by the first piece of control information; and perform data transmission, via the target beam, on one or a plurality of transmission units indicated by the first piece of control information.

With the data transmission apparatus provided in the embodiments of the present disclosure, the apparatus can obtain, according to the plurality of pieces of control information transmitted by a base station, a plurality of target beams corresponding to a plurality of transmission units indicated by each piece of control information based on a plurality of preset beam acquisitions rules, and perform data transmission according to the plurality of target beams, thereby implementing a multi-beam data transmission solution. Thus, the probability of packet loss during data transmission is reduced, and the reliability of data transmission is increased.

An embodiment of the present disclosure provides a data transmission apparatus comprising:

a second processor; and a second memory configured to store instructions executable by the second processor, wherein the second processor is configured to:

obtain a plurality of transmission units configured by a base station for a terminal;

generate a plurality of pieces of control information according to the plurality of transmission units, each piece of control information including resource information, the resource information indicating one or a plurality of transmission units configured by the base station for the terminal; and transmit, via a plurality of beams supported by the base station, the plurality of pieces of control information to the terminal.

In an embodiment, the second processor is further configured to: obtain the target beam corresponding to each of the plurality of transmission units; and generate the plurality of pieces of control information according to the plurality of transmission units and the target beam corresponding to each of the transmission units, wherein each piece of control information includes a beam information field, and information carried by the beam information field describes the target beam corresponding to each of the plurality of transmission units indicated by the corresponding resource information.

In an embodiment, the second processor is further configured to: obtain the target beam corresponding to each of the plurality of transmission units; generate a plurality of pieces of control information to be transmitted according to the plurality of transmission units and the target beam corresponding to each of the transmission units; and scramble the plurality of pieces of control information to be transmitted according to the scrambling sequence of different target beams to generate the plurality of pieces of control information.

In an embodiment, the second processor is further configured to transmit pre-configured information to the terminal, wherein the pre-configured information includes the corresponding relation between the transmission unit and the beam, so that the terminal obtains, according to the corresponding relation between the transmission unit and the beam, the target beam corresponding to each of the plurality of transmission units indicated by the plurality of pieces of control information With the data transmission apparatus provided by the embodiments of the present disclosure, the apparatus can transmit a plurality of pieces of control information to a terminal via a plurality of supported beams according to the requirements of the terminal, and inform the terminal, in multiple ways, beams corresponding to a plurality of transmission units indicated by each piece of control information in the plurality of pieces of control information, so that the terminal can perform data transmission on the plurality of transmission units according to the plurality of beams, thereby implementing a multi-beam data transmission solution. Thus, the probability of packet loss during data transmission is reduced, and the reliability of data transmission is increased.

With regard to the apparatus in the above-described embodiments, the specific manner in which the respective modules perform operations has been described in detail in embodiments of the methods, and details will not be illustrated herein.

Figure 9:
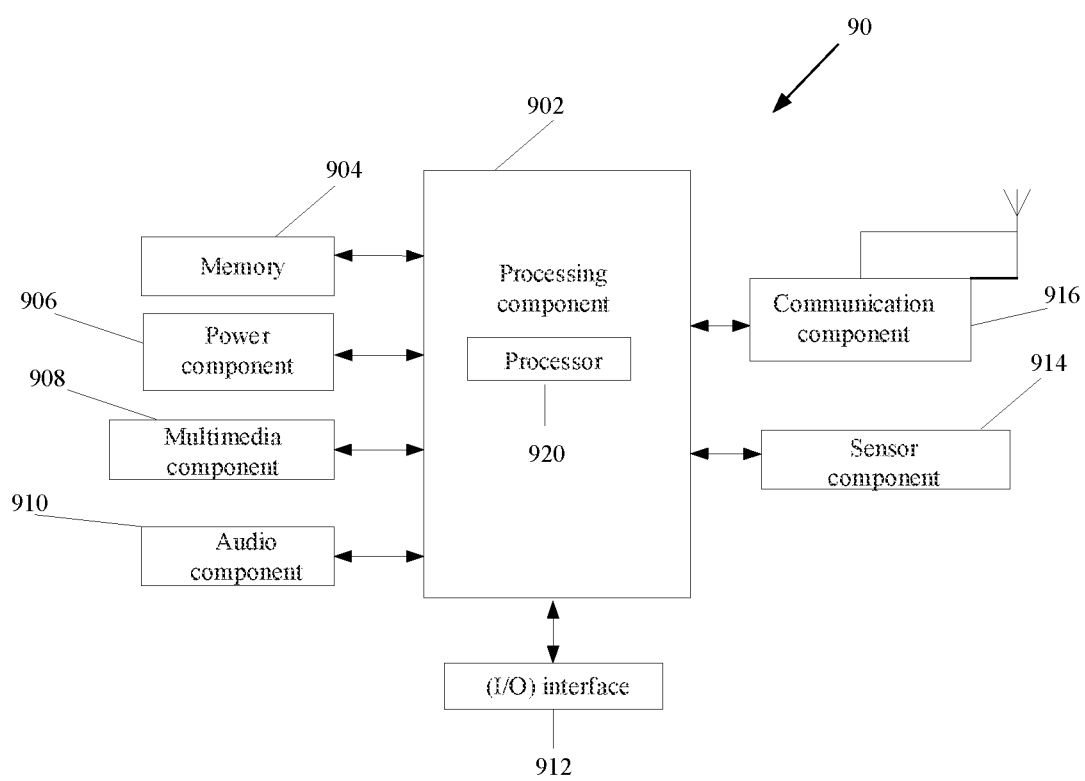
FIG. 9 is a block diagram of a structure of a data transmission apparatus according to an exemplary embodiment.

FIG. 9 is a block diagram of a data transmission apparatus 90 according to an exemplary embodiment of the present disclosure. For example, the apparatus 90 may be a mobile phone, a computer, a digital broadcast terminal, a message transceiver device, a game console, a tablet device, a piece of medical equipment, a piece of fitness equipment, a personal digital assistant, and the like.

Referring to FIG. 9, the apparatus 90 may include one or more of the following components: a processing component 902, a memory 904, a power component 906, a multimedia component 908, an audio component 910, an input/output (I/O) interface 912, a sensor component 914, and a communication component 916.

The processing component 902 generally controls overall operations of the apparatus 90, such as the operations associated with display, telephone calls, data communications, camera operations, and recording operations. The processing component 902 may include one or more processors 920 to execute instructions to perform all or part of the steps in the above described methods. Moreover, the processing component 902 may include one or more modules which facilitate the interaction between the processing component 902 and other components. For instance, the processing component 902 may include a multimedia module to facilitate the interaction between the multimedia component 908 and the processing component 902.

The memory 904 is configured to store various types of data to support the operation of the apparatus 90. Examples of such data include instructions for any applications or methods operated on the apparatus 90, contact data, phonebook data, messages, pictures, video, etc. The memory 904 may be implemented using any type of volatile or non-volatile memory devices, or a combination thereof, such as a static random-access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 906 provides power to various components of the apparatus 90. The power component 906 may include a power management system, one or more power sources, and any other components associated with the generation, management, and distribution of power in the apparatus 90.

The multimedia component 908 includes a screen providing an output interface between the apparatus 90 and the user. In some embodiments, the screen may include a liquid crystal display (LCD) and a touch panel (TP), If the screen includes the touch panel, the screen may be implemented as a touch screen to receive input signals from the user. The touch panel includes one or more touch sensors to sense touches, slips, and gestures on the touch panel. The touch sensors may not only sense a boundary of a touch or slip action, but also sense a period of time and a pressure associated with the touch or slip action. In some embodiments, the multimedia component 908 includes a front camera and/or a rear camera. The front camera and the rear camera may receive external multimedia data while the apparatus 90 is in an operation mode, such as a photographing mode or a video mode. Each of the front camera and the rear camera may be a fixed optical lens system or have focus and optical zoom capability.

The audio component 910 is configured to output and/or input audio signals. For example, the audio component 910 includes a microphone "MIC") configured to receive an external audio signal when the apparatus 90 is in an operation mode, such as a call mode, a recording mode, and a voice recognition mode. The received audio signal may be further stored in the memory 904 or transmitted via the communication component 916. In some embodiments, the audio component 910 further includes a speaker to output audio signals.

The I/O interface 912 provides an interface between the processing component 902 and peripheral interface modules, such as a keyboard, a click wheel, buttons, and the like. The buttons may include, but are not limited to, a home button, a volume button, a starting button, and a locking button.

The sensor component 914 includes one or more sensors to provide status assessments of various aspects of the apparatus 90. For instance, the sensor component 914 may detect the on/off state of the apparatus 90, relative positioning of components, e.g., the display and the keypad, of the apparatus 90, a change in position of the apparatus 90 or a component of the apparatus 90, a presence or absence of user contact with the apparatus 90, an orientation or an acceleration/deceleration of the apparatus 90, and a change in temperature of the apparatus 90. The sensor component 914 may include a proximity sensor configured to detect the presence of nearby objects without any physical contact. The sensor component 914 may also include a light sensor, such as a complementary metal oxide semiconductor (CMOS) or charge-coupled device (CCD) image sensor, for use in imaging applications. In some embodiments, the sensor component 914 may also include an accelerometer sensor, a gyroscope sensor, a magnetic sensor, a pressure sensor, or a temperature sensor.

The communication component 916 is configured to facilitate communication, wired or wirelessly, between the apparatus 90 and other devices. The apparatus 90 may access a wireless network based on a communication standard, such as WiFi, 2G, or 3G, or a combination thereof. In one exemplary embodiment, the communication component 916 receives a broadcast signal or broadcast associated information from an external broadcast management system via a broadcast channel. In one exemplary embodiment, the communication component 916 further includes a near field communication (NFC) module to facilitate short-range communications.

In exemplary embodiments, the apparatus 90 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components for executing the above methods.

In exemplary embodiments, there is also provided a non-transitory computer readable storage medium including instructions, such as the memory 904 including instructions. These instructions may be loaded and executed by the processor 920 in the apparatus 90 for executing the above methods. For example, the non-transitory computer readable storage medium may be a ROM, a random-access memory (RAM), a CD-ROM, a magnetic tape, a floppy disk, an optical data storage device or the like.

Figure 10:
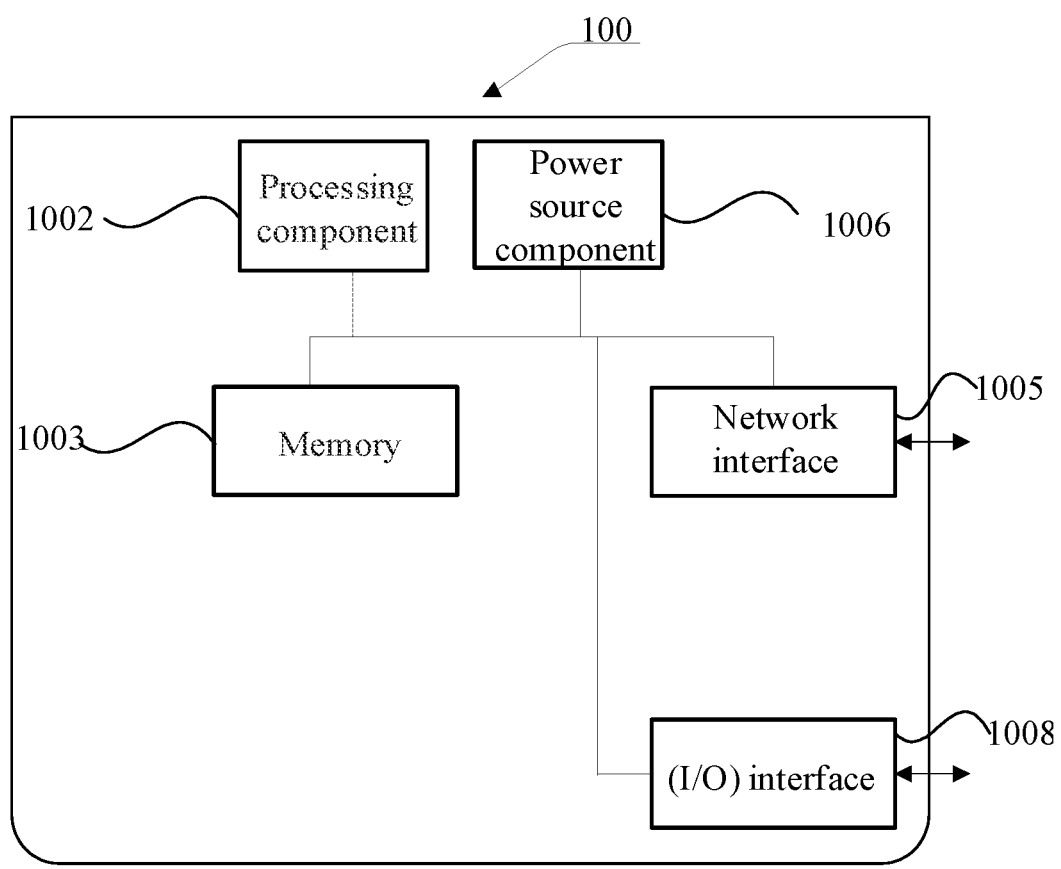
FIG. 10 is a block diagram of a structure of a data transmission apparatus according to an exemplary embodiment.

FIG. 10 is a schematic structural diagram of a data transmission apparatus 100 according to an embodiment of the present disclosure. For example, the apparatus 100 may be provided as a server arranged in a base station. The apparatus 100 includes a processing component 1002 which further includes one or more processors, and memory resources represented by a memory 1003 configured to store instructions, for example an application program, executable by the processing component 1002. The application program stored in the memory 1003 may include one or more module, each of which corresponds to a set of instructions. Further, the processing component 1002 is configured to execute instructions to perform the above methods.

The apparatus 100 may further include a power source component 1006 configured to perform power source management of the apparatus 100, a wired or wireless network interface 1005 configured to connect the apparatus 100 to the network, and an input/output (I/O) interface 1008. The apparatus 100 may operate an operating system stored in the memory 1003, such as Windows Server™, Mac OS X™, Unix™, Linux™, FreeBSD™ or the like.

An embodiment of the present disclosure provides a non-transitory computer-readable storage medium. When instructions in the storage medium are executed by a processor of the apparatus 90, the apparatus 90 is enabled to perform the data transmission method on the terminal side. The method includes:

receiving a plurality of pieces of control information transmitted by a base station via a plurality of beams, each piece of control information including resource information, the resource information indicating one or a plurality of transmission units configured by the base station for the terminal; and performing data transmission, via the plurality of beams, on the plurality of transmission units indicated by the plurality of pieces of control information according to the plurality of pieces of control information.

In an embodiment, performing data transmission, via the plurality of beams, on the plurality of transmission units indicated by the plurality of pieces of control information according to the plurality of pieces of control information includes: obtaining a plurality of target beams corresponding to a plurality of transmission units indicated by a first piece of control information according to a pre-stored corresponding relation between a transmission unit and a beam, each target beam corresponding to at least one transmission unit, and the first piece of control information being any one of the plurality of pieces of control information; and performing data transmission, via a first target beam, on at least one transmission unit corresponding to the first target beam among the plurality of transmission units indicated by the first piece of control information, the first target beam being any one of the plurality of target beams.

In an embodiment, the method further includes receiving pre-configured information sent by the base station, the pre-configured information including the corresponding relation between the transmission unit and the beam.

In an embodiment, performing data transmission, via the plurality of beams, on the plurality of transmission units indicated by the plurality of pieces of control information according to the plurality of pieces of control information includes: determining the beam of a first piece of control information transmitted by the base station as the target beam corresponding to the first piece of control information, the first piece of control information being any one of the plurality of pieces of control information; and performing data transmission, via the target beam, on one or a plurality of transmission units indicated by the first piece of control information.

In an embodiment, each piece of control information includes a beam information field, and the information carried by the beam information field describes the target beam corresponding; to each of the plurality of transmission units indicated by the corresponding resource information. Performing data transmission, via the plurality of beams, on the plurality of transmission units indicated by the plurality of pieces of control information according to the plurality of pieces of control information includes: parsing the beam information field of the first piece of control information; obtaining one or a plurality of target beams corresponding to the plurality of transmission units indicated by the first piece of control information, the first piece of control information being any one of the plurality of pieces of control information; and performing data transmission, via the first target beam, on the transmission unit corresponding to the first target beam, the first target beam being any one of the plurality of target beams.

In an embodiment, performing data transmission, via the plurality of beams, on the plurality of transmission units indicated by the plurality of pieces of control information according to the plurality of pieces of control information includes: obtaining the scrambling sequence of a first piece of control information, the first piece of control information being any one of the plurality of pieces of control information; obtaining, according to the scrambling sequence, the target beam corresponding to each of the plurality of transmission units indicated by the first piece of control information; and performing data transmission, via the target beam, on one or a plurality of transmission units indicated by the first piece of control information.

An embodiment of the present disclosure provides a non-transitory computer readable storage medium. When the instructions in the storage medium are executed by a processor of the apparatus 100, the apparatus 100 is enabled to execute the data transmission method on the base station side, and the method includes:

obtaining a plurality of transmission units configured by the base station for a terminal;

generating a plurality of pieces of control information according to the plurality of transmission units, each piece of control information including resource information, the resource information indicating one or a plurality of transmission units configured by the base station for the terminal; and transmitting, via a plurality of beams supported by the base station, the plurality of pieces of control information to the terminal.

In an embodiment, generating a plurality of pieces of control information according to the plurality of transmission units includes: obtaining the target beam corresponding to each of the plurality of transmission units; and generating the plurality of pieces of control information according to the plurality of transmission units and the target beam corresponding to each of the transmission units, wherein each piece of control information includes a beam information field, and the information carried by the beam information field describes the target beam corresponding to each of the plurality of transmission units indicated by the corresponding resource information.

In an embodiment, generating a plurality of pieces of control information according to the plurality of transmission units includes: obtaining the target beam corresponding to each of the plurality of transmission units; generating a plurality of pieces of control information to be transmitted according to the plurality of transmission units and the target beam corresponding to each of the transmission units; and scrambling the plurality of pieces of control information to be transmitted according to the scrambling sequence of different target beams to generate the plurality of pieces of control information.

In an embodiment, the method includes: transmitting pre-configured information to the terminal, wherein the pre-configured information includes a corresponding relation between the transmission unit and the beam, so that the terminal obtains, according to the corresponding relation between the transmission unit and the beam, a target beam corresponding to each of the plurality of transmission units indicated by the plurality of pieces of control information.

Other embodiments of the present disclosure will be apparent to those skilled in the art from consideration of the specification and practice of the present disclosure. The present disclosure is intended to cover any variations, uses, or adaptations of the present disclosure following the general principles thereof and including common knowledge or commonly used technical measures which are not disclosed herein. The specification and embodiments are to be considered as exemplary only, and the true scope and spirit of the present disclosure is indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

The invention claimed is:

1. A data transmission method, the method comprising:
receiving, by a terminal, a plurality of pieces of control information transmitted by a base station via a plurality of beams, each piece of control information being information for resource scheduling and comprising resource information, the resource information indicating one or more transmission units configured by the base station for the terminal to send data or receive data, each transmission unit being a slot, a symbol, a sub-frame, a radio frame, or other types of time domain units in time domain, and each transmission unit being a frequency domain resource block, a bandwidth part, or other types of frequency domain units in frequency domain;
acquiring, by the terminal, a first plurality of transmission units indicated by a first piece of control information, the first piece of control information being any one of the plurality of pieces of control information;
obtaining, by the terminal, a plurality of beams corresponding to the first plurality of transmission units by querying a pre-stored corresponding relation between a transmission unit and a beam, each beam corresponding to at least one transmission unit and
performing, by the terminal, data transmission, via a first beam, on at least one transmission unit corresponding to the first beam among the first plurality of transmission units indicated by the first piece of control information, the first beam being any one of the plurality of beams corresponding to the first plurality of transmission units.

2. The method according to claim 1, further comprising:
receiving pre-configured information sent by the base station, the pre-configured information comprising the corresponding relation between the transmission unit and the beam.

3. A data transmission method applied to a base station, the method comprising:
obtaining one or more transmission units configured by the base station for a terminal to send data or receive data, each transmission unit being a slot, a symbol, a sub-frame, a radio frame, or other types of time domain units in time domain, and each transmission unit being a frequency domain resource block, a bandwidth part, or other types of frequency domain units in frequency domain;
generating a plurality of pieces of control information according to the one or more transmission units, each piece of control information being information for resource scheduling and comprising resource information, the resource information indicating one or more transmission units configured by the base station for the terminal; and
transmitting, via a plurality of beams supported by the base station, the plurality of pieces of control information to the terminal,
to cause the terminal to:
acquire a first plurality of transmission units indicated by a first piece of control information, the first piece of control information being any one of the plurality of pieces of control information;
obtain a plurality of beams corresponding to the first plurality of transmission units by querying a pre-stored corresponding relation between a transmission unit and a beam, each beam corresponding to at least one transmission unit and
perform data transmission, via a first beam, on at least one transmission unit corresponding to the first beam among the first plurality of transmission units indicated by the first piece of control information, the first beam being any one of the plurality of beams corresponding to the first plurality of transmission units.

4. The method according to claim 3, further comprising:
transmitting pre-configured information to the terminal, wherein the pre-configured information comprises a corresponding relation between a transmission unit and a beam, so that the terminal obtains, according to the corresponding relation between the transmission unit and the beam, a beam corresponding to each of the one or more transmission units indicated by the plurality of pieces of control information.

5. A data transmission apparatus, comprising:
a processor; and
a memory configured to store instructions executable by the first processor;
wherein the processor is configured to:
receive a plurality of pieces of control information transmitted by a base station via a plurality of beams, each piece of control information being information for resource scheduling and comprising resource information, the resource information indicating one or more transmission units configured by the base station for a terminal to send data or receive data, each transmission unit being a slot, a symbol, a sub-frame, a radio frame, or other types of time domain units in time domain, and each transmission unit being a frequency domain resource block, a bandwidth part, or other types of frequency domain units in frequency domain;
acquire a first plurality of transmission units indicated by a first piece of control information, the first piece of control information being any one of the plurality of pieces of control information;
obtain a plurality of beams corresponding to the first plurality of transmission units by querying a pre-stored corresponding relation between a transmission unit and a beam, each beam corresponding to at least one transmission unit and
perform data transmission, via a first beam, on at least one transmission unit corresponding to the first beam among the first plurality of transmission units indicated by the first piece of control information, the first beam being any one of the plurality of beams corresponding to the first plurality of transmission units.

6. The apparatus according to claim 5, wherein the processor is further configured to:
receive pre-configured information sent by the base station, the pre-configured information comprising the corresponding relation between the transmission unit and the beam.

7. A data transmission apparatus comprising:
a processor; and
a memory configured to store instructions executable by the processor;
wherein the processor is configured to:
obtain one or more transmission units configured by a base station for a terminal to send data or receive data, each transmission unit being a slot, a symbol, a sub-frame, a radio frame, or other types of time domain units in time domain, and each transmission unit being a frequency domain resource block, a bandwidth part, or other types of frequency domain units in frequency domain;

generate a plurality of pieces of control information according to the one or more transmission units, each piece of control information being information for resource scheduling and comprising resource information, the resource information indicating one or more transmission units configured by the base station for the terminal; and transmit, via a plurality of beams supported by the base station, the plurality of pieces of control information to the terminal, to cause the terminal to:

acquire a first plurality of transmission units indicated by a first piece of control information, the first piece of control information being any one of the plurality of pieces of control information;

obtain a plurality of beams corresponding to the first plurality of transmission units by querying a pre-stored corresponding relation between a transmission unit and a beam, each beam corresponding to at least one transmission unit and perform data transmission, via a first beam, on at least one transmission unit corresponding to the first beam among the first plurality of transmission units indicated by the first piece of control information, the first beam being any one of the plurality of beams corresponding to the first plurality of transmission units.

8. The apparatus according to claim 7, wherein the processor is further configured to:

transmit pre-configured information to the terminal, wherein the pre-configured information comprises a corresponding relation between a transmission unit and a beam, so that the terminal obtains, according to the corresponding relation between the transmission unit and the beam, a beam corresponding to each of the one or more transmission units indicated by the plurality of pieces of control information.

* * * * *